(12) United States Patent
Nguyen et al.

(10) Patent No.: US 8,824,544 B2
(45) Date of Patent: Sep. 2, 2014

(54) METHOD AND SYSTEM FOR RECOVERY OF MISSING SPECTRAL INFORMATION IN WIDEBAND SIGNAL

(75) Inventors: Lam Huy Nguyen, Laurel, MD (US); Thong Do, Beltsville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/477,282

(22) Filed: May 22, 2012

(65) Prior Publication Data

US 2013/0236115 A1    Sep. 12, 2013

Related U.S. Application Data

(63) Continuation-in-part of application No. 13/416,062, filed on Mar. 9, 2012.

(51) Int. Cl.
   *H04B 1/66* (2006.01)
(52) U.S. Cl.
   USPC .......................... 375/240; 375/224; 375/316
(58) Field of Classification Search
   CPC ................ H04L 2027/003; H04L 2027/0032; H04L 27/206
   USPC ........................... 375/240, 224, 316; 341/155
   See application file for complete search history.

(56) References Cited

U.S. PATENT DOCUMENTS

| | | | |
|---|---|---|---|
| 5,805,098 A | 9/1998 | McCorkle | |
| 7,796,829 B2 | 9/2010 | Nguyen | |
| 2006/0132345 A1* | 6/2006 | Raz | 341/155 |
| 2008/0129560 A1* | 6/2008 | Baraniuk et al. | 341/87 |
| 2010/0302086 A1* | 12/2010 | Dudgeon et al. | 341/155 |
| 2010/0310011 A1* | 12/2010 | Sexton et al. | 375/316 |
| 2011/0163912 A1 | 7/2011 | Nguyen et al. | |
| 2012/0112957 A1 | 5/2012 | Nguyen et al. | |

OTHER PUBLICATIONS

Lam Nguyen ("Signal and Image Processing Algorithms for the U.S. Army Research Laboratory Ultra-wideband (UWB) Synchronous Impulse Reconstruction (SIRE) Radar", Apr. 2009, ARL, total 68 pages).*

Lam Nguyen et al. ("Improving SAR Image of Mine-Type Targets from Restricted Radar Band Data", 2005, ARL, total 10 pages).*

(Continued)

*Primary Examiner* — Sam K Ahn
*Assistant Examiner* — Fabricio R Murillo Garcia
(74) *Attorney, Agent, or Firm* — Lawrence E. Anderson

(57) ABSTRACT

A system of recovering information wide band signal comprising a receiver(s) for receiving data signal responses from a target area; the received data signal responses having information missing at a plurality of frequencies; at least one processor for recovery of data from the data signal responses operatively connected to the receiver(s); a first memory comprising time-shifted responses based upon the wide band signal response, a second memory comprising a plurality of spectrally filtered time-shifted responses; whereby the first and second memories operate to provide data to the at least one processor compensate for the information missing at the plurality of frequencies. Also, a method of the recovery of missing frequency bands comprising receiving data signal responses from a target area using a first dictionary comprising time-shifted responses based upon spectra containing the at least one predetermined spectrum, and a second dictionary comprising a plurality of spectrally filtered time-shifted responses.

20 Claims, 17 Drawing Sheets
(15 of 17 Drawing Sheet(s) Filed in Color)

(56) References Cited

OTHER PUBLICATIONS

T. Miller, L. Potter, and J. McCorkle, "RFI Suppression for Ultra Wideband Radar," IEEE Transactions on Aerospace and Electronic Systems, vol. 33, No. 4, Oct. 1997.

M. Ressler, "The Army Research Laboratory Ultra Wide-Bandwidth Boom Synthetic Aperture Radar," May 1996, IGARSS96 Symposium Report, pp. 1886-1888.

"Decoding by linear programming," IEEE Trans. on Information Theory, vol. 51, No. 12, pp. 4203-4215 (Dec. 2005).

M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, No. 4, pp. 586-598 (Apr. 2007).

J. Tropp and A. Gilbert, "Signal recovery from random measurements via orthogonal matching pursuit," IEEE Trans. on Information Theory, vol. 53, No. 12, pp. 4655-4666 (Dec. 2007).

D. Needell and R. Vershynin, "Signal recovery from incomplete and inaccurate measurements via regularized orthogonal matching pursuit," IEEE Journal of Selected Topics in Signal Processing, vol. 4, pp. 310-316 (Apr. 2010).

W. Dai and O. Milenkovic, "Subspace pursuit for compressive sensing: Closing the gap between performance and complexity," IEEE Trans. on Information Theory, vol. 55, pp. 2230-2249 (May 2009).

T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (Oct. 2008).

Nguyen, L. H., Kapoor, R., Sichina, J., "Detection algorithms for ultrawideband foliage-penetration radar," Proceedings of SPIE vol. 3066, pp. 165-176 (1997).

L. Nguyen, K. Kappra, D. Wong, R. Kapoor, and J. Sichina, "Mine field detection algorithm utilizing data from an ultrawideband wide-area surveillance radar," Proc. SPIE Int. Soc. Opt. Eng. 3392, 627 (1998).

Nguyen, L., Ressler, M., Sichina, J., "Sensing through the wall imaging using the Army Research Lab ultra-wideband synchronous impulse reconstruction (UWB SIRE) radar," Proceedings of SPIE vol. 6947, 69470B (2008).

Nguyen, L.; Soumekh, M. "System Trade Analysis for an Ultra-wideband Forward Imaging Radar," Proceedings of SPIE, Unmanned Systems Technology VIII, vol. 6230, 2006.

John McCorkle and Lam Nguyen, "Focusing of Dispersive Targets Using Synthetic Aperture Radar," Army Research Laboratory Report, ARL-TR-305, Aug. 1994.

S. G. Mallat and Z. Zhang, "Matching pursuits with time-frequency dictionaries." IEEE Transactions on Signal Processing, vol. 41, No. 12, pp. 3397-3415, 1993.

R. Tibshirani, "Regression shrinkage and selection via the lasso," Journal of the Royal Statistical Society. Series B (Methodological), pp. 267-288, 1996.

D. L. Donoho and M. Elad, "Optimally sparse representation in general (nonorthogonal) dictionaries via l1 minimization," Proceedings of the National Academy of Sciences 100.5, pp. 2197-2202, 2003.

Real-Time Versus Equivalent-Time SamplingTektronix Application Note, http://www2.tek.com/cmswpt/tidetails.lotr?ct=TI&cs=Application+Note&ci=14295&lc=EN. Jan. 1, 2001.

Lam Nguyen, "Signal and Image Processing Algorithms for the U.S Army Research Laboratory Ultra-wideband (UWB) Synchronous Impulse Reconstruction (SIRE) Radar," Army Research Laboratory Technical Report, ARL-TR-4784, Apr. 2009.

Nguyen, L. H.; Ton, T. T.; Wong, D. C.; Ressler, M. A. Signal Processing Techniques for Forward Imaging Using Ultrawideband Synthetic Aperture Radar. Proceedings of SPIE 5083, 505, (2003).

Thong T. Do, Trac D. Tran and Lu Gan, "Fast compressive sampling using structurally random matrices", Proc. of ICASSP 2008, Las Vegas, Apr. (2008).

Ressler, Marc, et al., "The Army Research Laboratory (ARL) Synchronous Impulse Reconstruction (SIRE} Forward-Looking Radar," Proceedings of SPIE, Unmanned Systems Technology IX, vol. 6561. May 2007.

E. Candès and T. Tao, "Decoding by linear programming," IEEE Trans. on Information Theory, vol. 51, No. 12, pp. 4203-4215 (Dec. 2005).

S. Becker, et al., "NESTA: a Fast and Accurate First-order Method for Sparse Recovery," SIAM J. on Imaging Sciences, 4, 1-39 (2011).

E. J. Candès and M. Wakin, "An introduction to compressive sampling," IEEE Signal Processing Magazine, vol. 25, No. 2, pp. 21-30, Mar. 2008.

Nguyen, L., "Image Resolution Computation for Ultra-Wideband (UWB) Synchronous Impulse Reconstruction (SIRE) Radar" Army Research Laboratory Technical Report ARL-TN-294, Army Research Laboratory Adelphi, MD 20783-1197, Sep. 2007.

Nguyen, L.; Wong, D.; Ressler, M.; Koenig, F.; Stanton, B.; Smith, G.; Sichina, J.; Kappra, K. "Obstacle Avoidance and Concealed Target Detection Using the Army Research Lab Ultra-Wideband Synchronous Impulse Reconstruction (UWB SIRE) Forward Imaging Radar," Proceedings of SPIE, Detection and Remediation Technologies for Mines and Minelike Targets XII, vol. 6553, Apr. 2007.

Nguyen, L. H.; Ton, T.; Wong, D.; Soumekh, M. "Adaptive Coherent Suppression of Multiple Wide-bandwidth RFI Sources in SAR," Proceedings of SPIE Int. Soc. Opt. Eng. vol. 5427, 1, 2004.

Nguyen, L.; Soumekh, M. "Suppression of Radio Frequency Interference (RFI) for Synchronous Impulse Reconstruction Ultra-wideband Radar," Proceedings of SPIE, Algorithms for Synthetic Aperture Radar Imagery XII, 178. Jun. 14, 2005.

Nguyen, L. "Signal Processing Technique to Remove Signature Distortion in ARLSynchronous Impulse Reconstruction (SIRE) Ultra-Wideband (UWB) Radar;" ARL-TR-4404; U.S. Army Research Laboratory: Adelphi, MD, Mar. 2008.

John W. McCorkle, "Focusing of Synthetic Aperture Ultra Wideband Data," IEEE Int'l Conf on Systems Engineering, Aug. 1992, p. 1-5.

M. Ressler et al., "The Army Research Laboratory Ultra-Wideband Testbed Radars," IEEE 1995 International Radar Conference, Alexandria, VA., May 1995.

Nguyen, L., Soumekh, M., "Improving SAR image of mine-type targets from restricted radar band data," Proceedings of SPIE vol. 5794, pp. 522-531 (2005).

Lam Nguyen and Trac Tran, "Robust Recovery of Synthetic Aperture Radar Data from Uniformly Under-Sampled Measurements," IEEE Geoscience and Remote Sensing Symposium (IGARSS), 2011 IEEE International(Jul. 2011).

* cited by examiner

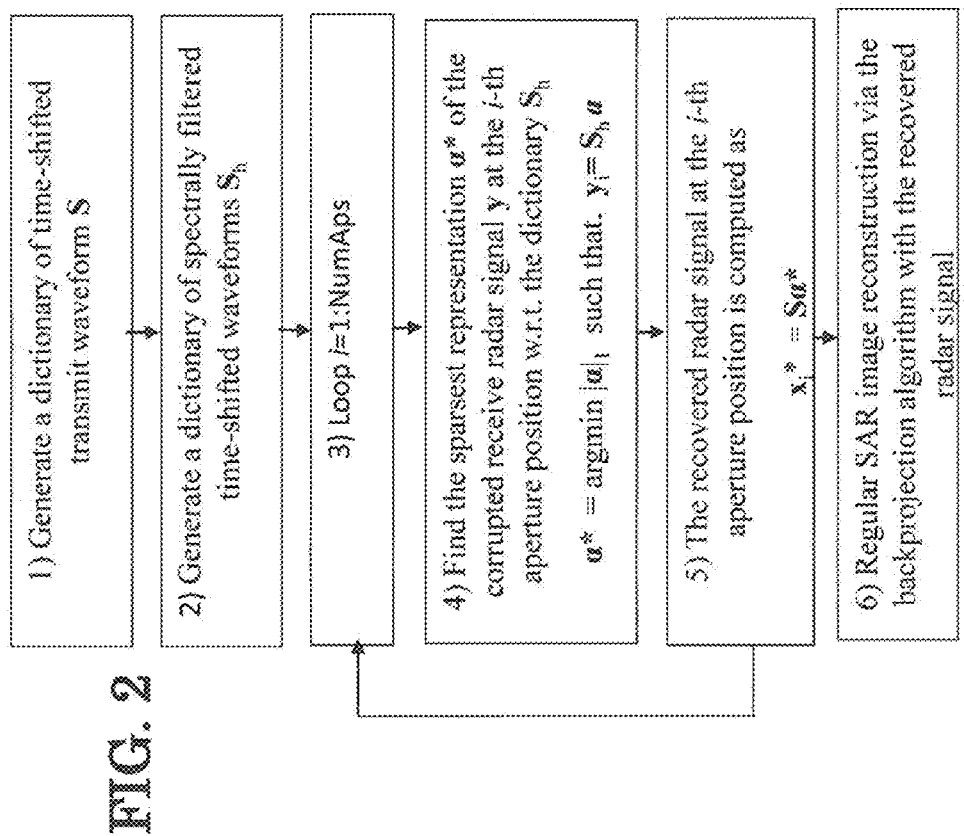

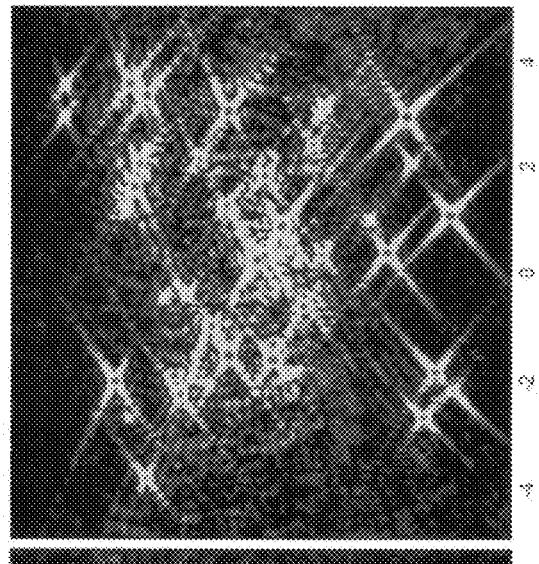
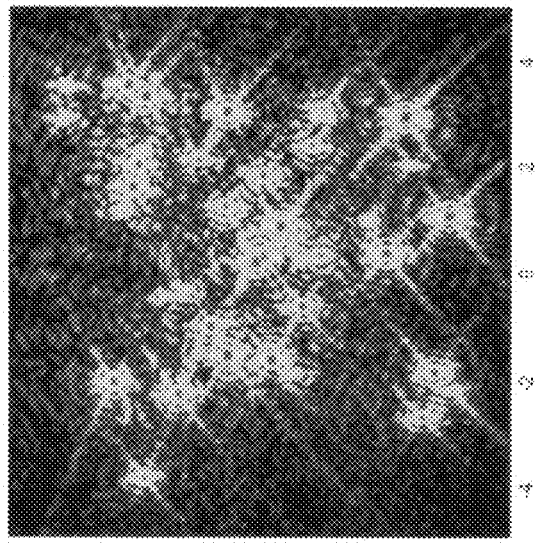
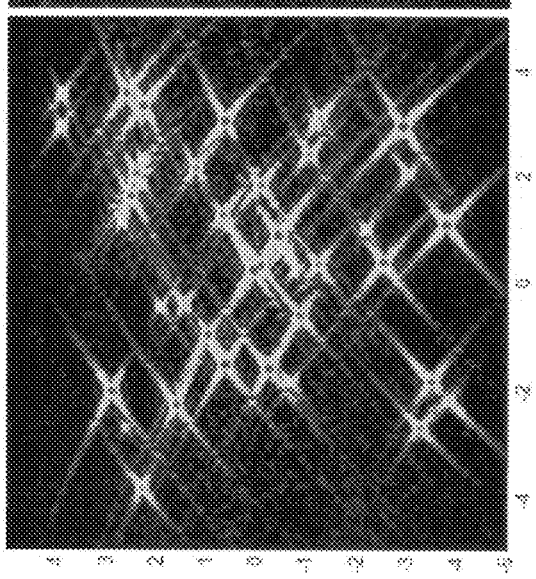

FIG. 4A FULL SPECTRUM

FIG. 4B SPECTRALLY NOTCHED

FIG. 4C RECOVERY

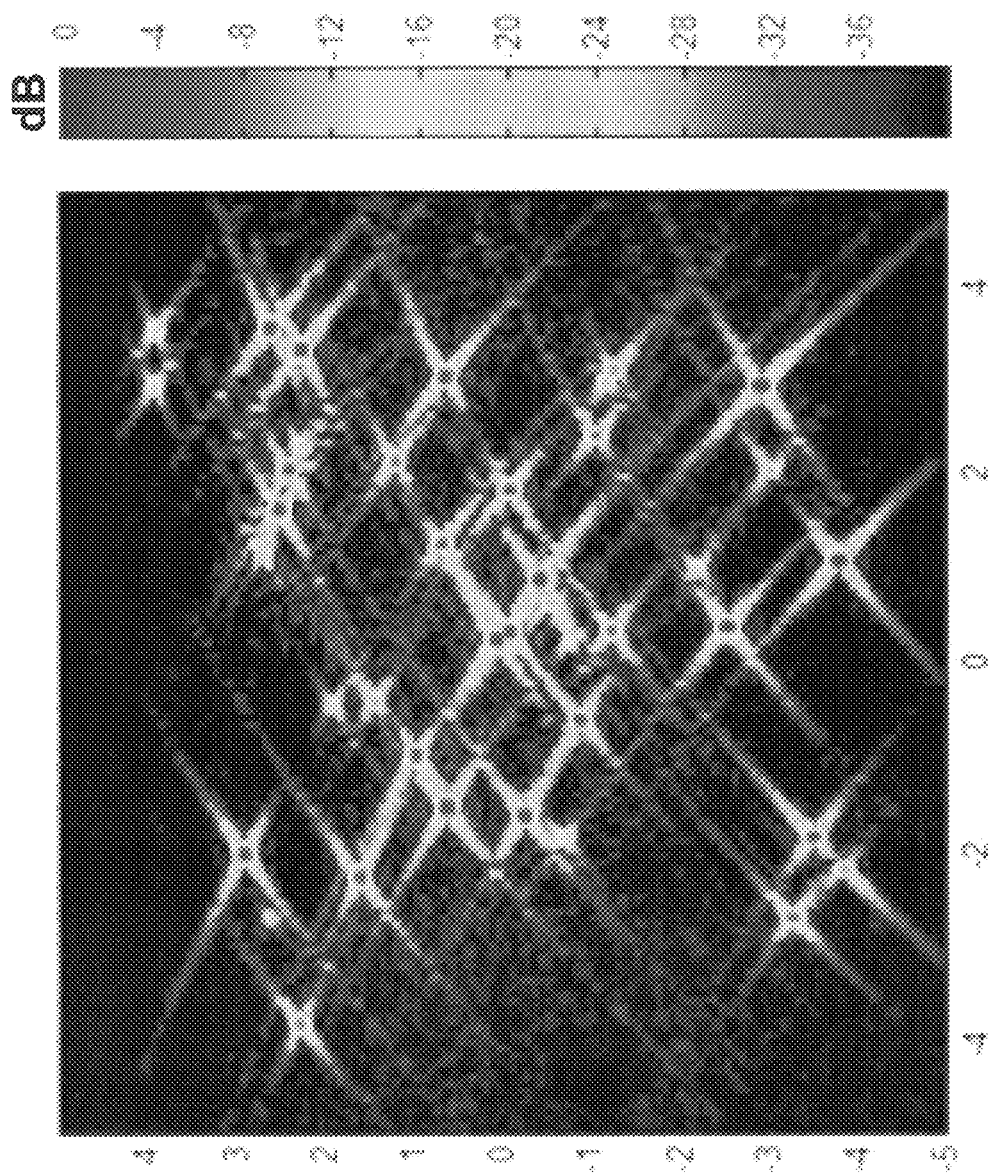
Figure 7A Original SAR image.

Noisy SAR image due to interference sources in addition to spectral notches.

Interference noise from SAR image is removed using conventional technique (zero out FFT bins that correspond to corrupted frequency bands).

SAR image using the Preferred Embodiment spectral recovery technique.

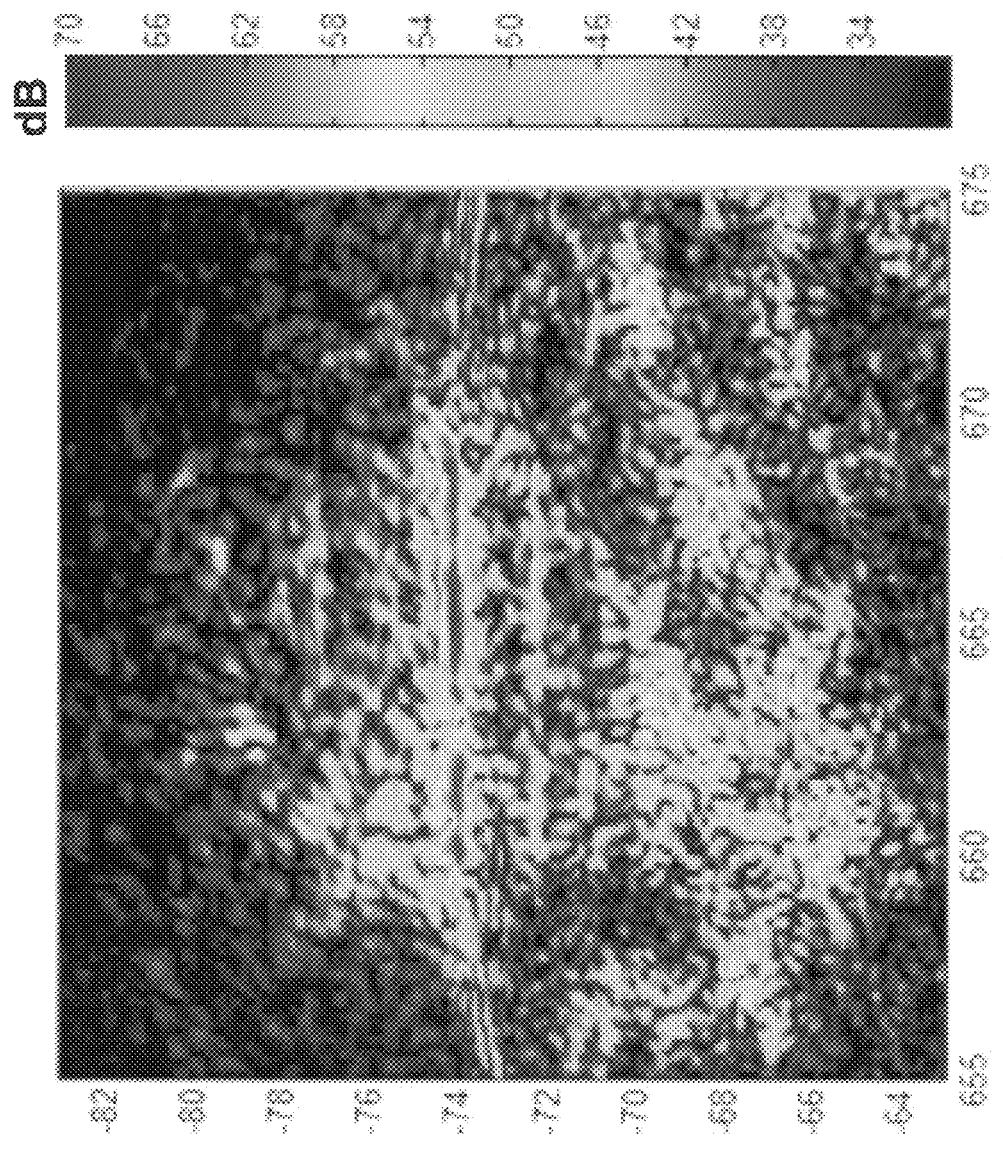
FIG. 8A Original SAR image (with full spectrum) using data from the ARL UWB SAR system.

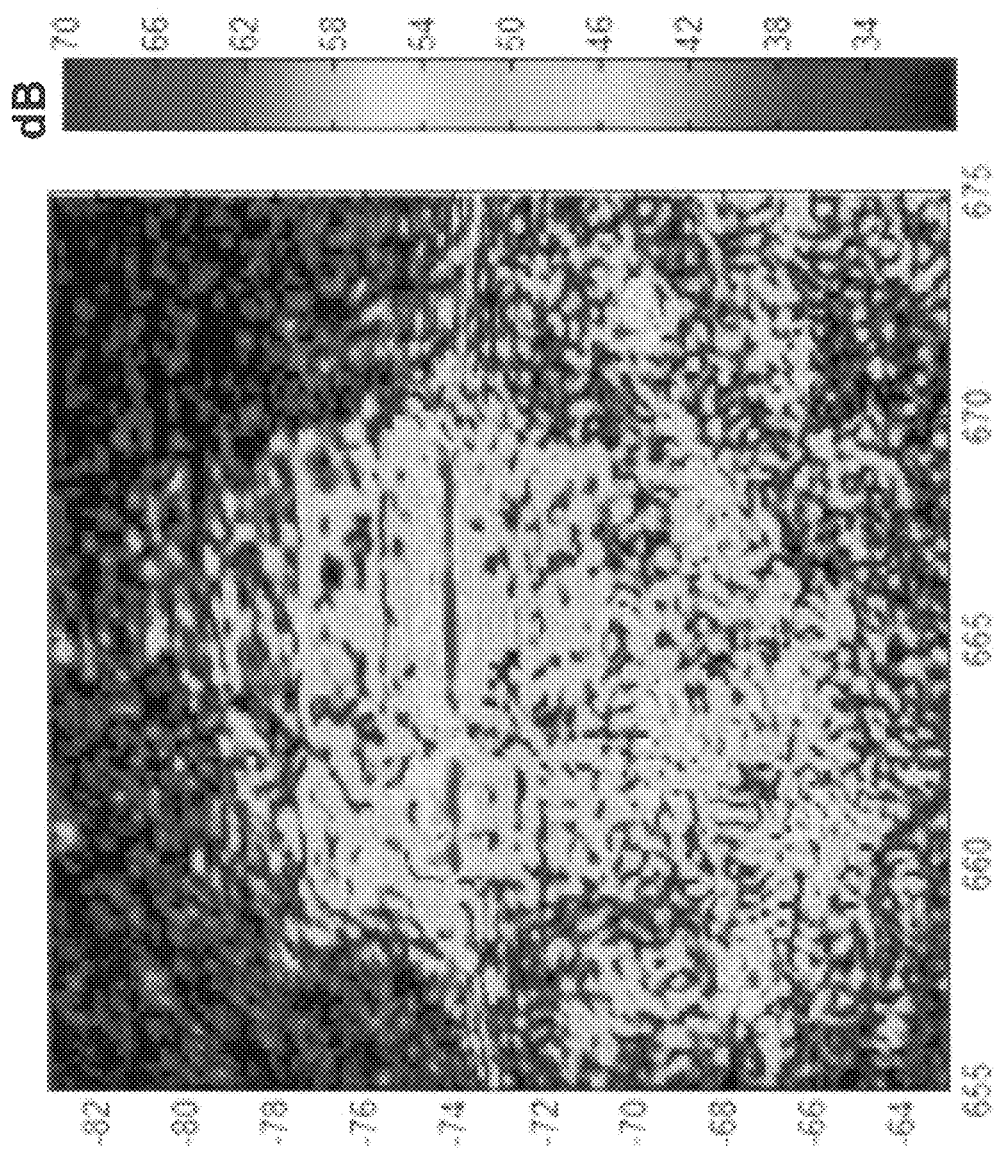
FIG. 8B Noisy SAR image due to the spectral notches.

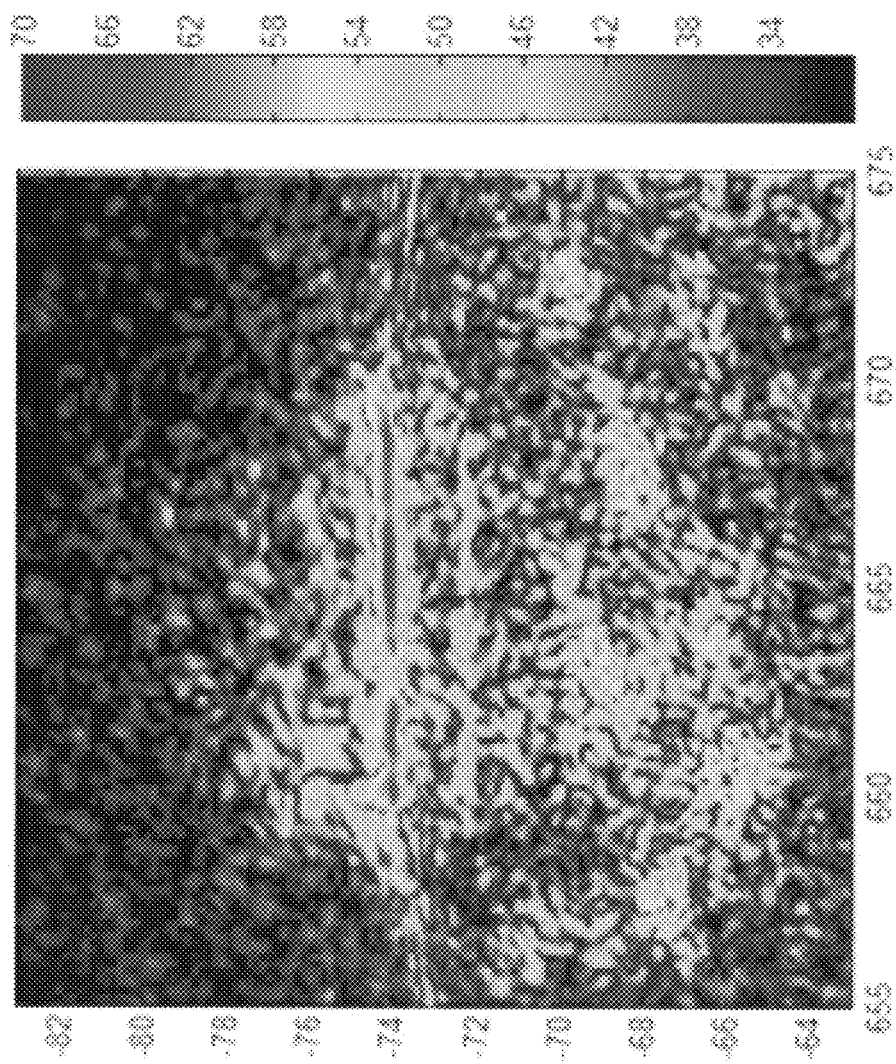
FIG. 8C SAR image after spectral recovery using the Preferred Embodiment Technique.

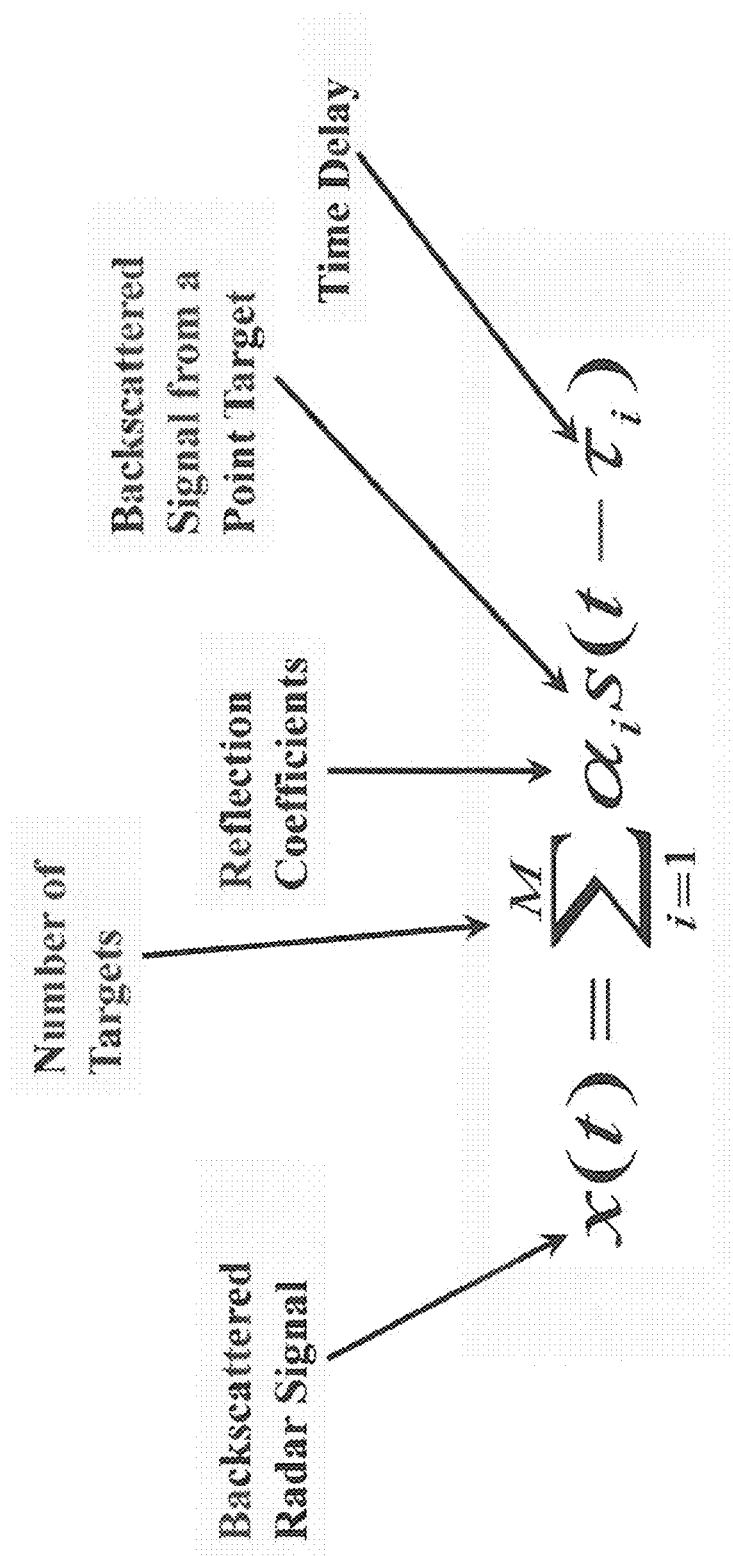
FIG. 9    Radar Signal Model

SIGNAL MODEL WITH MISSING SPECTRAL INFORMATION IN MATRIX FORM

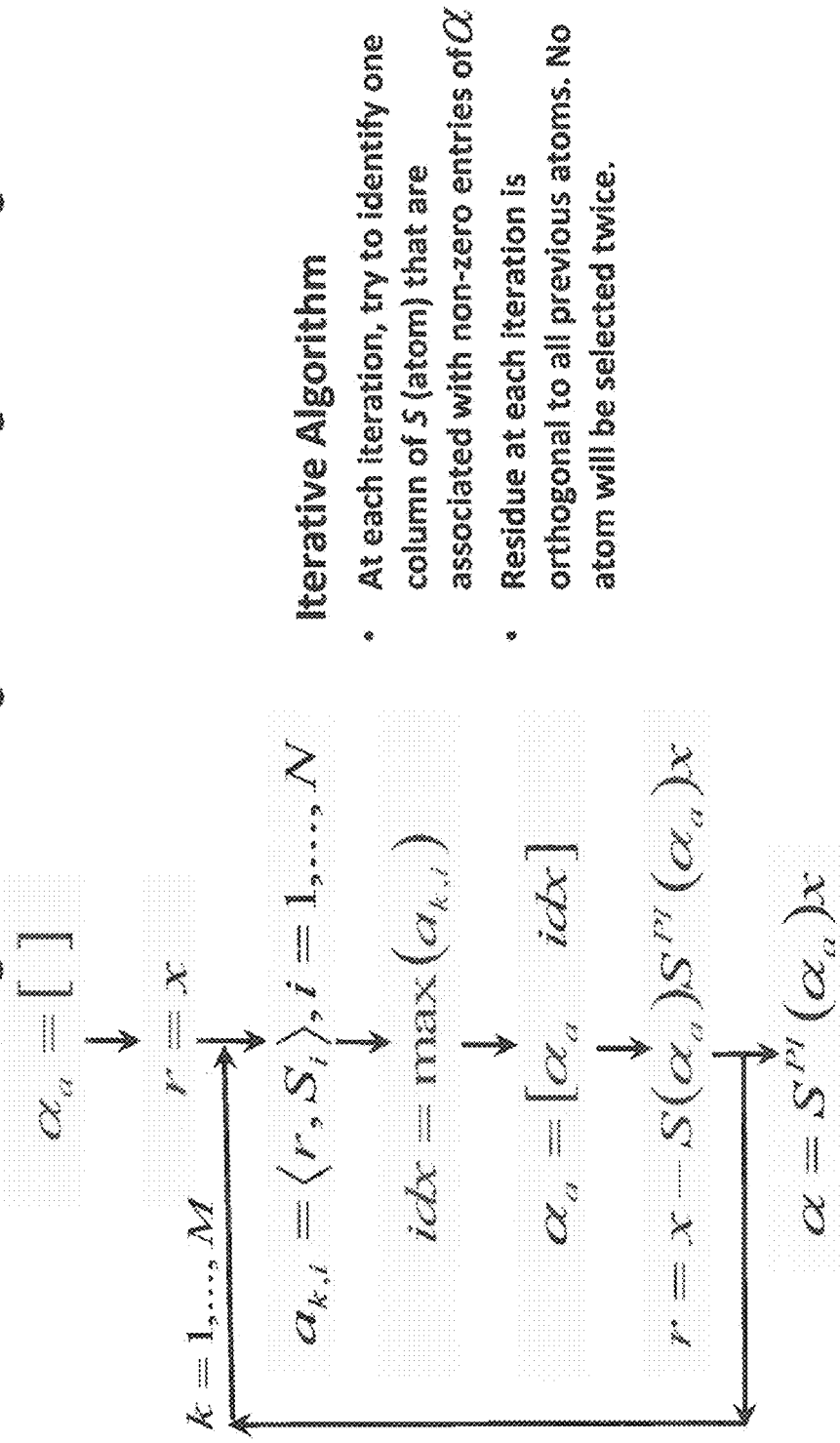

METHOD AND SYSTEM FOR RECOVERY OF MISSING SPECTRAL INFORMATION IN WIDEBAND SIGNAL

CROSS REFERENCE TO RELATED APPLICATIONS

This application is a continuation-in-part of and claims priority to U.S. patent application Ser. No. 13/416,062 entitled "Apparatus and Method for Sampling and Reconstruction of Wide Bandwidth Signals below Nyquist Rate," filed Mar. 9, 2012, hereby incorporated by reference.

STATEMENT OF GOVERNMENT INTEREST

The embodiments herein may be manufactured, used, and/or licensed by or for the United States Government without the payment of royalties thereon.

REFERENCE TO PARTIAL COMPUTER PROGRAM LISTING

Appendix A contains a partial computer program listing adapted for a preferred embodiment of the present invention.

BACKGROUND OF THE INVENTION

The present invention relates to the generation of images from projection measurements. Examples of images generated from projection measurements include two-dimensional and three-dimensional SAR (synthetic aperture radar) systems. SAR is a form of radar in which the large, highly-directional rotating antenna used by conventional radar is replaced with many low-directivity small stationary antennas scattered over some area near or around the target area. For example, as shown in FIG. 1 of U.S. Pat. No. 5,805,098 to McCorkle, hereby incorporated by reference, an aircraft mounted detector array is utilized to take ground radar measurements. Other examples of systems using projection measurements are fault inspection systems using acoustic imaging, submarine sonar for imaging underwater objects, seismic imaging system for tunnel detection, oil exploration, geological surveys, etc., and medical diagnostic tools such as sonograms, echocardiograms, x-ray CAT (computer-aided tomography) equipment and MRI (magnetic resonance imaging) equipment.

Wide-bandwidth signals are widely used in communications and radar systems. Over the past few decades, the research and development of ultra-wideband (UWB) systems have achieved significant progress. One of the key features of these UWB systems is the penetration capability. For example, the U.S. Army has been developing UWB radar systems for detection of difficult targets in various applications such as foliage penetration, ground penetration, and sensing through the walls of buildings or harriers (sensing-through-the-wall). Therefore, these systems must operate in the low-frequency spectrum that spans from under 100 MHz to several GHz in order to achieve the penetration capability. In addition to the low-frequency requirement for penetration, these systems must employ wide-bandwidth signals to achieve the desired resolution. Thus, the signal occupies a wide spectrum that also shared by radio, TV, cellular phone, and other systems. For example, radio waves in general usage have wavelengths ranging from hundreds of meters to about one millimeter and are used for transmission of data, via modulation. Television, mobile phones, wireless networking, and amateur radio all use radio waves. The use of the radio spectrum is regulated by many governments through frequency allocation.

The frequency allocation and utilization problem becomes a big challenge and only gets worse over time since additional radar and communication systems that need the penetration feature must operate in this low-frequency region of the spectrum. The FCC and international treaties in general restrict the bands between 5 and 30 MHz, since they are particularly useful for long-distance communications.

There are at least two challenges for any UWB system (radar or communications. The first is that the system must operate in the presence of other systems. The received UWB signal through the channel is contaminated by signals from all systems that operate in the same spectrum. Because of this, the received signal would have a spectral content that includes many frequency subbands that are corrupted by energy from all other sources. Within these corrupted subbands, the energy of the received signal is much smaller than that from the interference sources. In the time domain, the signal is very noisy and might be embedded in the noise floor. Except for targets with very large amplitudes, most targets may not be detectable in the presence of interference noise. Conventional techniques usually detect the corrupted frequency bands (due to the interference sources) by searching for the spikes in the spectral domain. The fast Fourier transform (FFT) bins that correspond to the contaminated frequency bands are zeroed out. This technique results in severe sidelobes in the time or spatial domain of the output data and imagery due to the sharp transitions (frequency samples with no information) in the frequency domain. In addition, simply suppressing the information in the contaminated frequency bands will reduce the signal-to-noise ratio (SNR) of the received signal.

The second challenge is that the system must avoid transmitting energy in certain frequency bands that are specified by the frequency management agencies. Thus, the received UWB signal would have a spectral content that is not contiguous (due to spectral notches that correspond to the prohibited frequency bands). The notches in the frequency domain translate to severe noise and artifacts in the resulting data and imagery. Depending on the size of the spectral notches, state-of-the-art systems might have to process each contiguous band separately to get results from multiple bands. Since the results from multiple bands are interpreted independently, this creates another challenge for the detection and discrimination stages.

SUMMARY OF THE INVENTION

A preferred embodiment of the present invention is directed to a system of recovering missing spectral information in a wide band signal comprising a receiver for receiving data signal responses from a target area; the received data signal responses being spectrally filtered with respect to at least one predetermined spectrum; at least one processor for recovery of data from the data signal responses operatively connected to the receiver that digitizes the received data signals; a first dictionary comprising time-shifted responses based upon spectra containing the at least one predetermined spectrum, and a second dictionary comprising a plurality of spectrally filtered time-shifted responses. The first and second dictionaries operate to provide data to the at least one processor in order to compensate for the spectrally filtered responses to provide a composite image representative of the unfiltered spectra. The wideband signal may be transmitted using a transmit pulse that includes at least one spectral notch that removes a prohibited frequency hand or bands, and the at least one receiver's data signal responses may be spectrally notched at the prohibited frequency band or bands. In this case the first and second dictionaries operate to provide supplemental information that compensates for the information missing due to the notching of the prohibited frequency band or bands. In one preferred embodiment, the composite image is formed from the spectrally filtered responses using one of orthogonal matching pursuit, basis pursuit, gradient projection, matching pursuit, orthogonal matching pursuit, regularized matching pursuit or subspace pursuit. The first dictionary may comprise a matrix of digitized samples of unfiltered spectra responses stacked in column vectors, each column vector associated with an incremental delay, and wherein the incremental delay is substantially the highest increment possible that the system can support without an ineffective signal being produced. As an example, first dictionary may comprise collected data records x which can be represented as x=Sα where x represents column vectors containing data records and matrix S is a matrix whose columns contain time shifted versions of the transmitted signal and α is the sparse vector of weighting coefficients wherein significant coefficients reveal potential phase-shift and amplitude information of significant targets. The linear combination for signal recovery may be solved using an orthogonal matching pursuit technique wherein as α is optimized to be the sparsest vector such that $y=S_h\alpha$.

In particular, the first memory or dictionary may comprise a first matrix that may be represented by matrix S, and the second memory or dictionary may comprise a second matrix of based upon the notched spectral that may be represented by the matrix $S_h$ where the relationship between the two matrices is $S_h=S*h$, wherein the matrix $S_h$ (with the notched spectral content) is a linear combination of the delayed and weighted replicas of the notched versions of the time-shifted transmit waveforms, and where h is the transfer function in vector form that corresponds to the notched spectral and the actual received signal is a convolution of the original signal and the transfer function y=x*h and wherein the coefficients α can be computed from the measurements y and the spectrally notched dictionary $S_h$ by solving the following optimization problem:

$$\alpha^*=\min|\alpha|_0 \text{ such that. } y=S_h\alpha,$$

Also disclosed is a preferred method for recovery of missing frequency bands when using, for example, a notched wide band signal transmission system, comprising receiving data signal responses from a target area using a receiver; the received data signal responses being spectrally filtered and/or having missing information with respect to at least one predetermined spectrum; digitizing the received data signals using at least one processor for recovery of data from the data signal responses operatively connected to the receiver; creating a first dictionary comprising time-shifted responses based upon spectra containing the at least one predetermined spectrum, creating a second dictionary comprising a plurality of spectrally filtered time-shifted responses; the first and second dictionaries operating to provide data to the at least one processor to compensate for the spectrally filtered responses in order to provide a composite image representative of the unfiltered spectra.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 3A, 3B, 3C, 4A, 4B, 4C, 5, 6, 7A, 7B, 7C, 7D, 8A, 8B, and 8C, the colors represent a decibel range which ranges from red to blue, red being the strongest signal and blue being the weakest.

Figure 1:
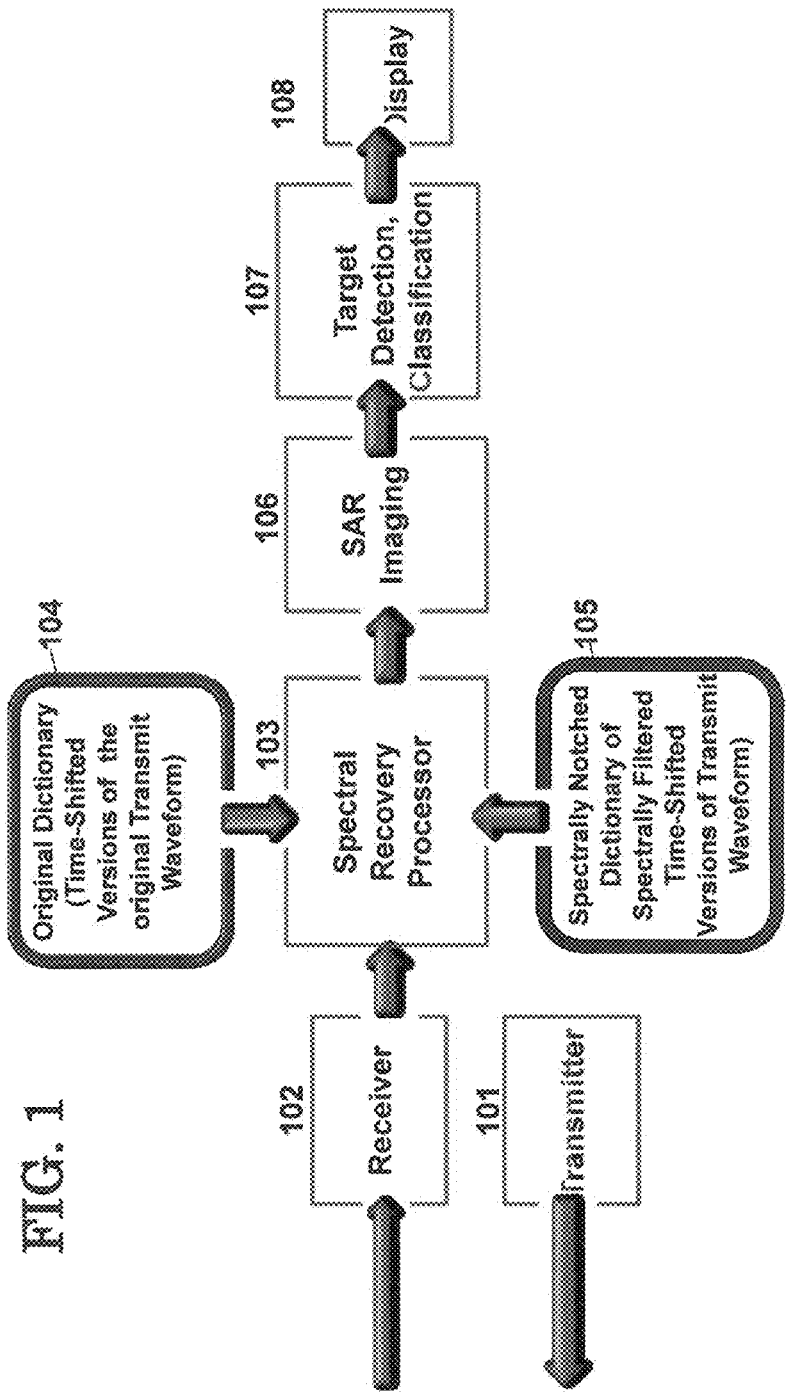

The embodiments herein will be better understood from the following detailed description with reference to the drawings, in which:

FIG. 1 is a schematic block diagram of a preferred embodiment of the present invention.

FIG. 2 is a flow chart of a preferred method of the present invention.

FIG. 3A is an illustration of a SAR image using full spectrum data.

FIG. 3B is an illustration of a SAR image using spectrally notched data.

FIG. 3C is an illustration of a SAR image after spectral recovery.

FIG. 4A is an illustration of a Zoomed-in SAR image using full spectrum data.

FIG. 4B is an illustration of a Zoomed-in SAR image using spectrally notched data.

FIG. 4C is an illustration of a Zoomed-in SAR image after spectral recovery.

Figure 4D:
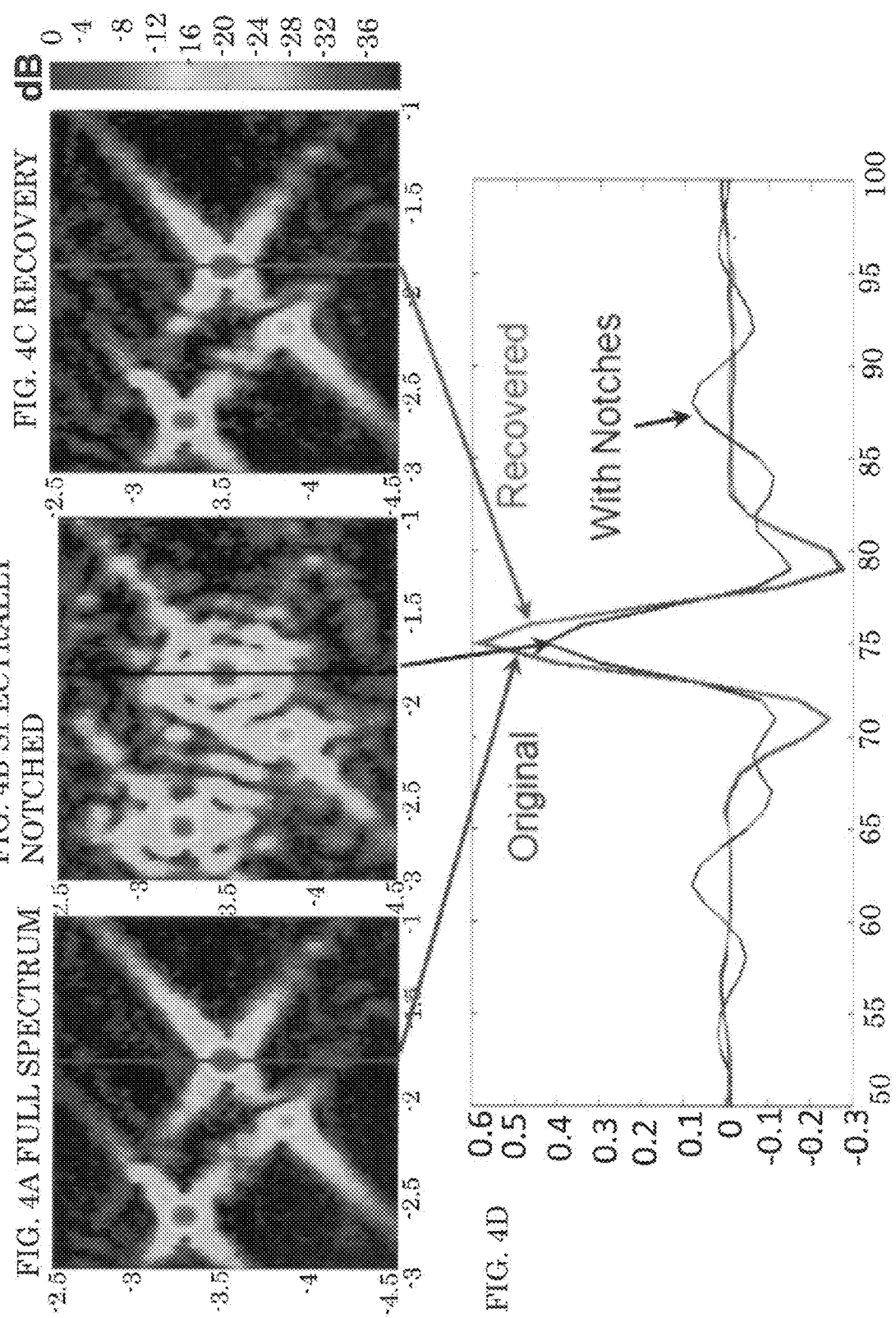

FIG. 4D is a graphical illustration showing down-range profiles from three SAR images.

Figure 5:
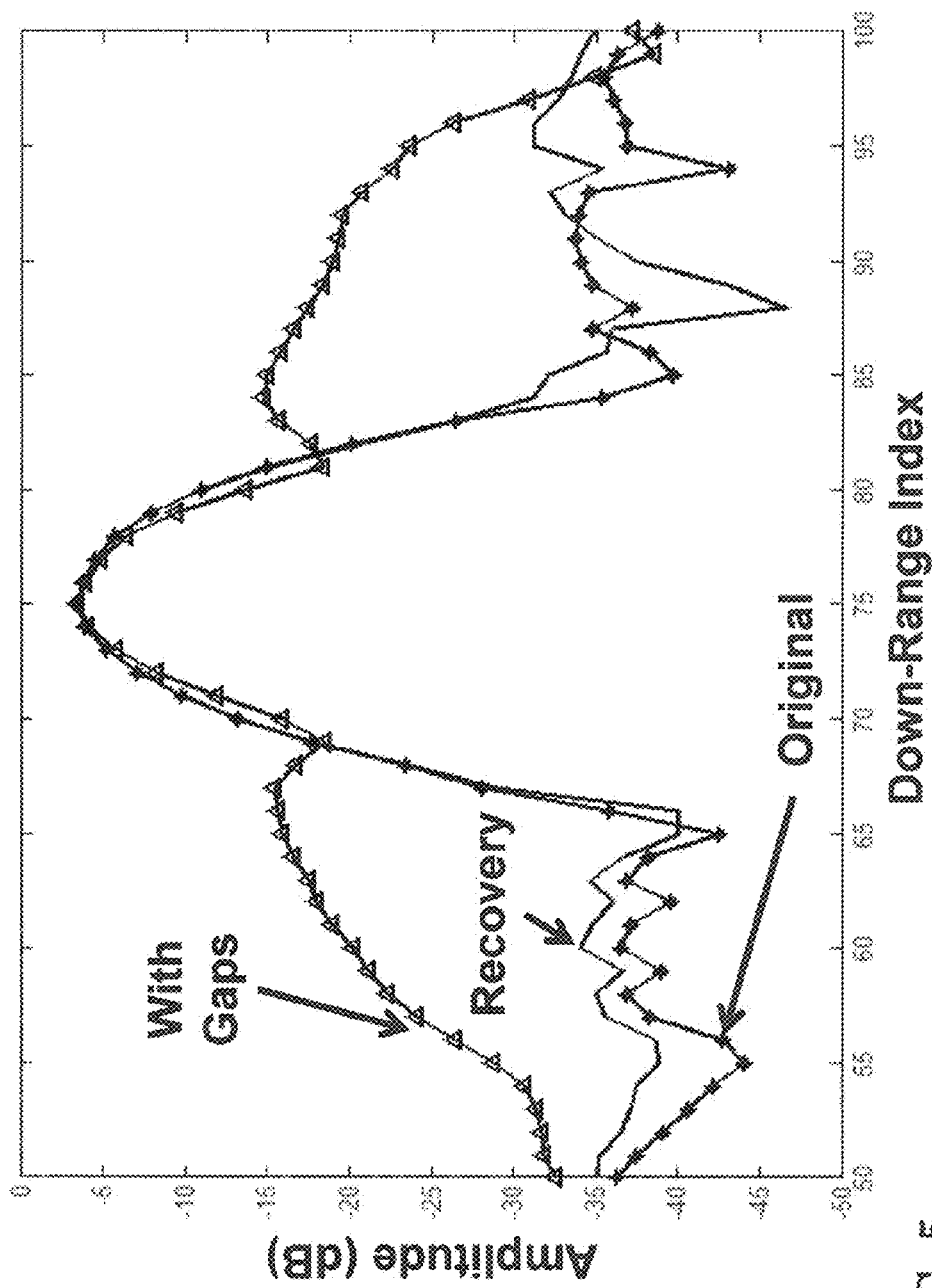

FIG. 5 is a graphical illustration showing normalized down-range profiles from three SAR images.

Figure 6:
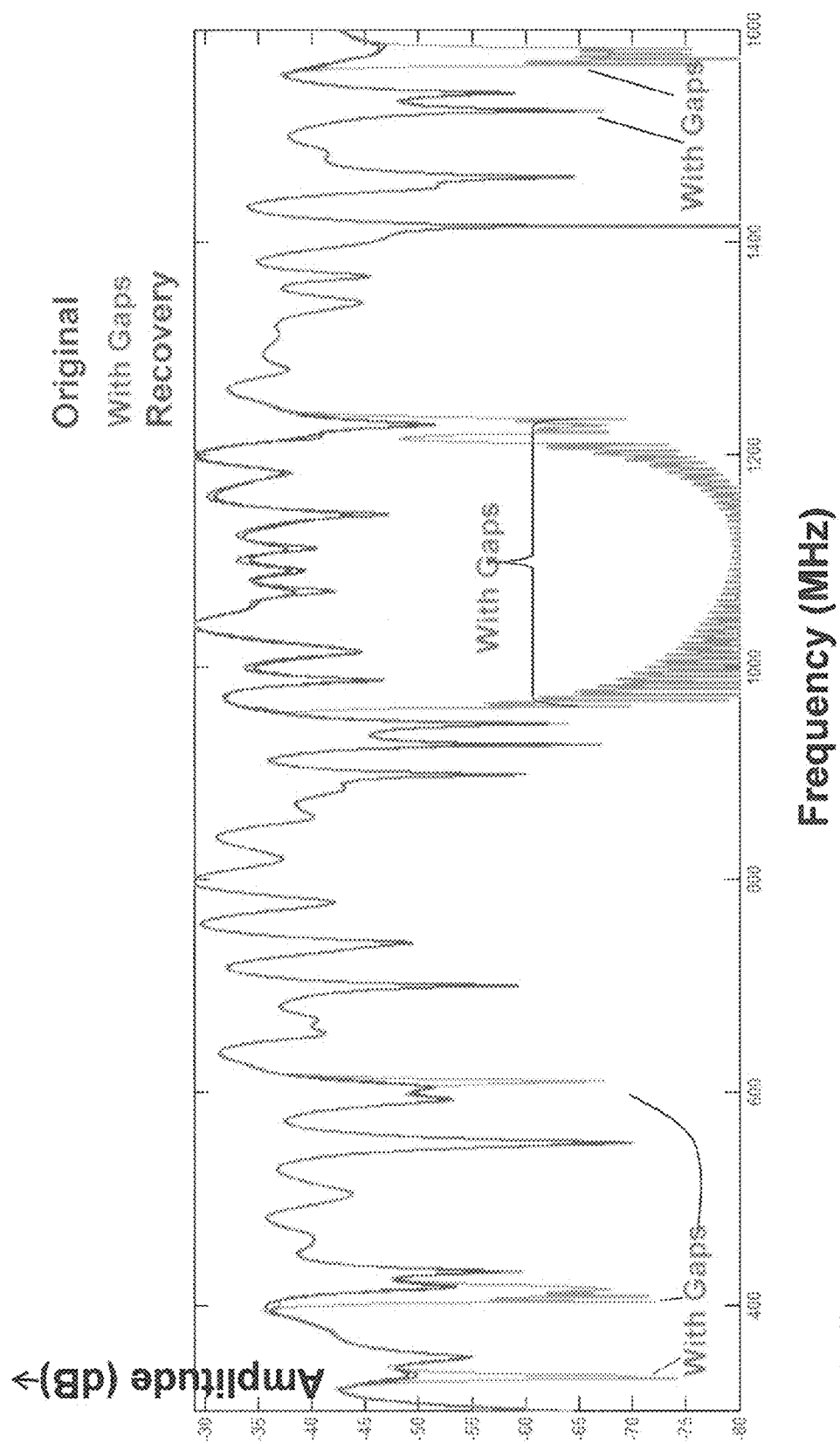

FIG. 6 is a graphical illustration showing the frequency domain information of the original signal, the corrupted signal, and the recovered signal using the preferred embodiment technique.

FIG. 7A is an illustration of an original SAR image.

Figure 7B:
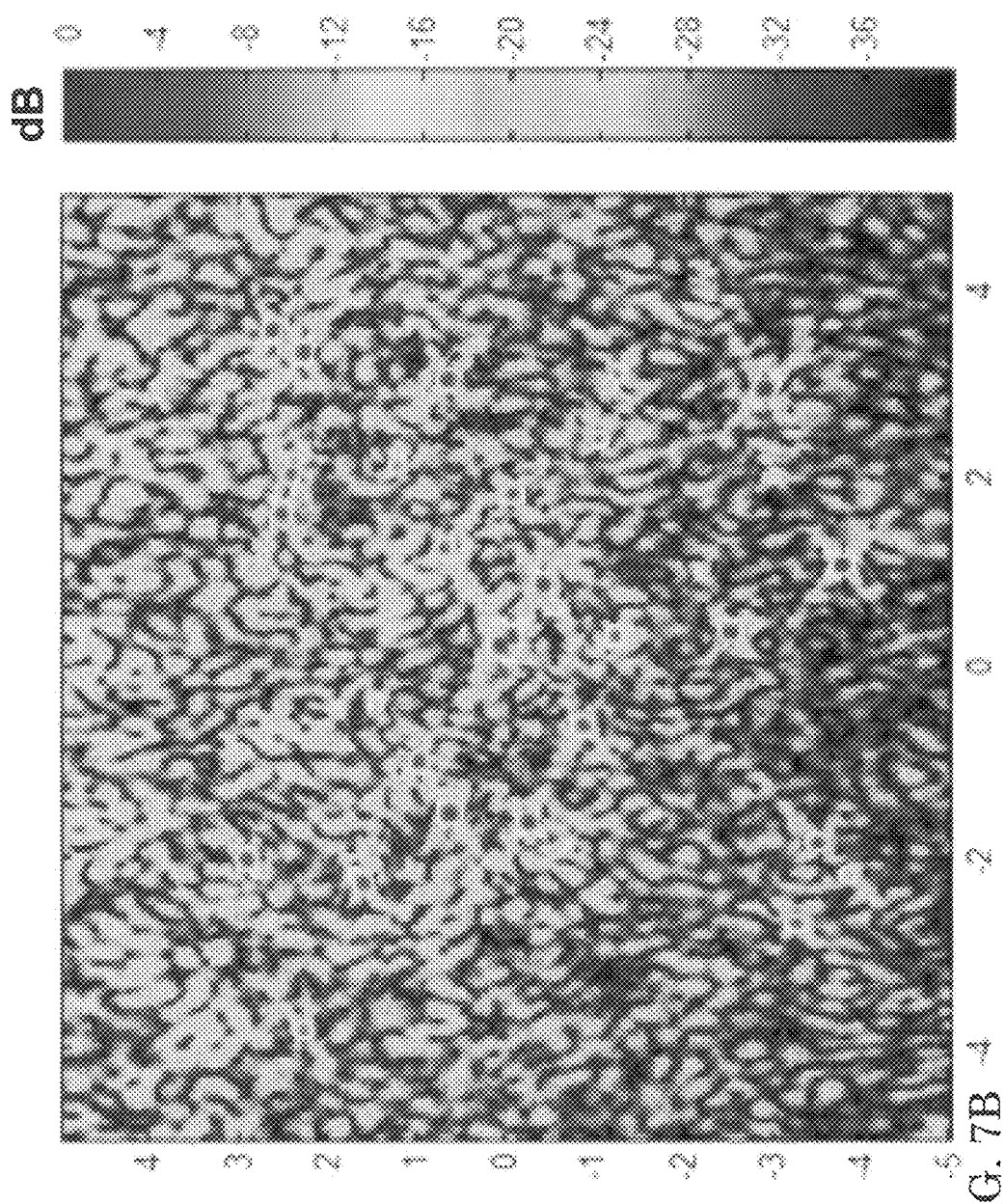

FIG. 7B is an illustration of a noisy SAR image due to interference sources in addition to spectral notches.

Figure 7C:
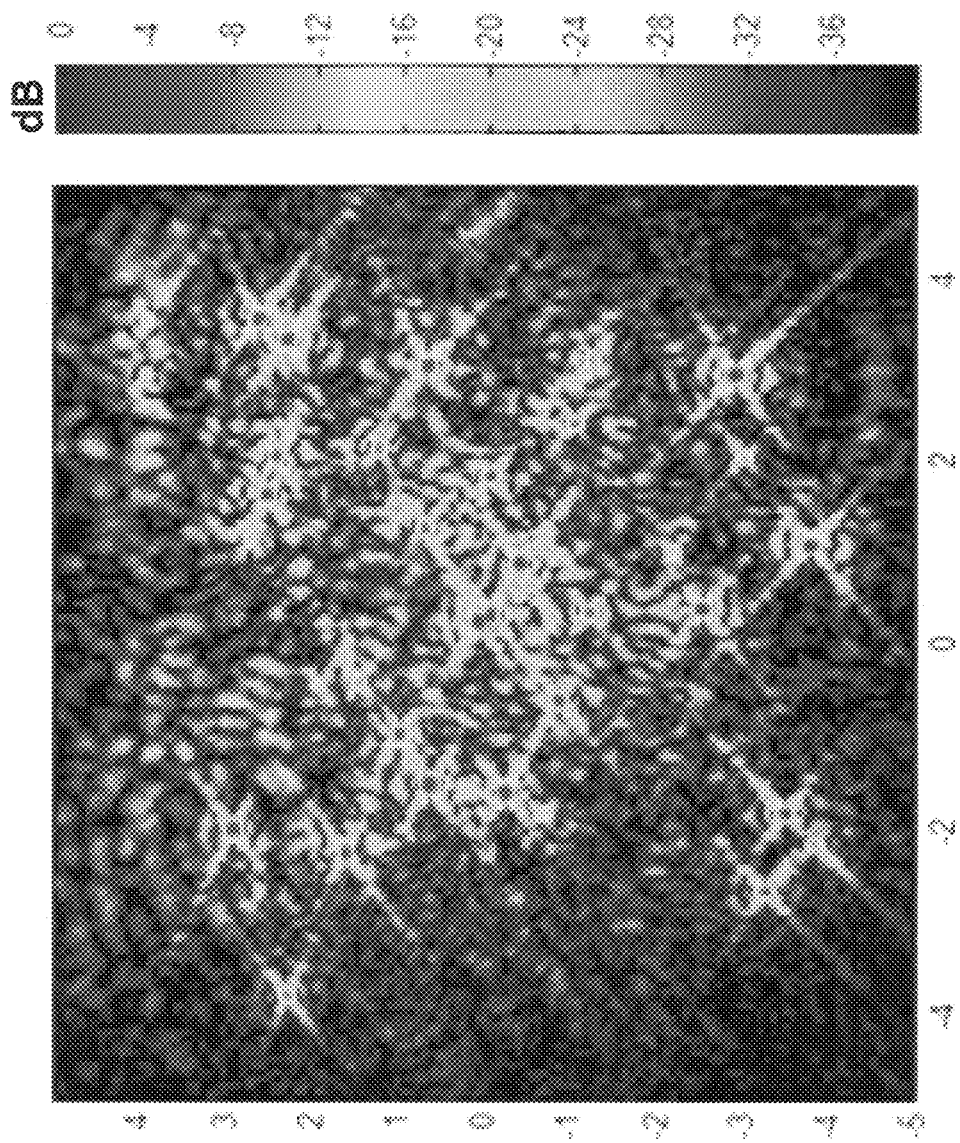

FIG. 7C is an illustration showing resulting image after interference noise removal from SAR image using conventional technique (zero out FFT bins that correspond to corrupted frequency bands).

Figure 7D:
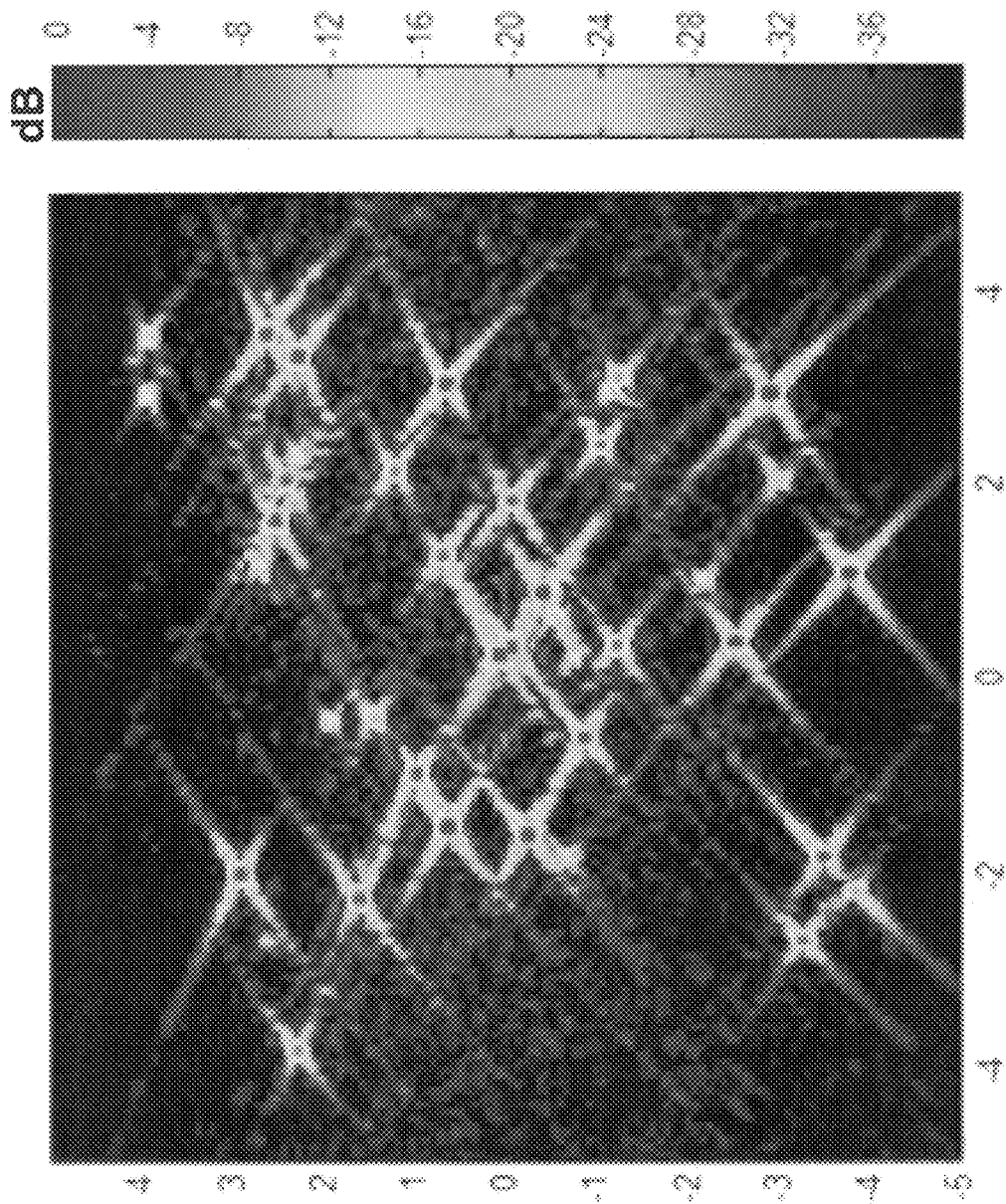

FIG. 7D is an illustration of a SAR image using the preferred embodiment spectral recovery technique.

FIG. 8A is an illustration of an original SAR image (with full spectrum) using data from the ARL UWB SAR system.

FIG. 8B is an illustration of noisy SAR image due to the spectral notches.

FIG. 8C is an illustration of a SAR image after spectral recovery using the preferred embodiment technique.

FIG. 9 is a schematic illustration of the signal model.

Figure 10:
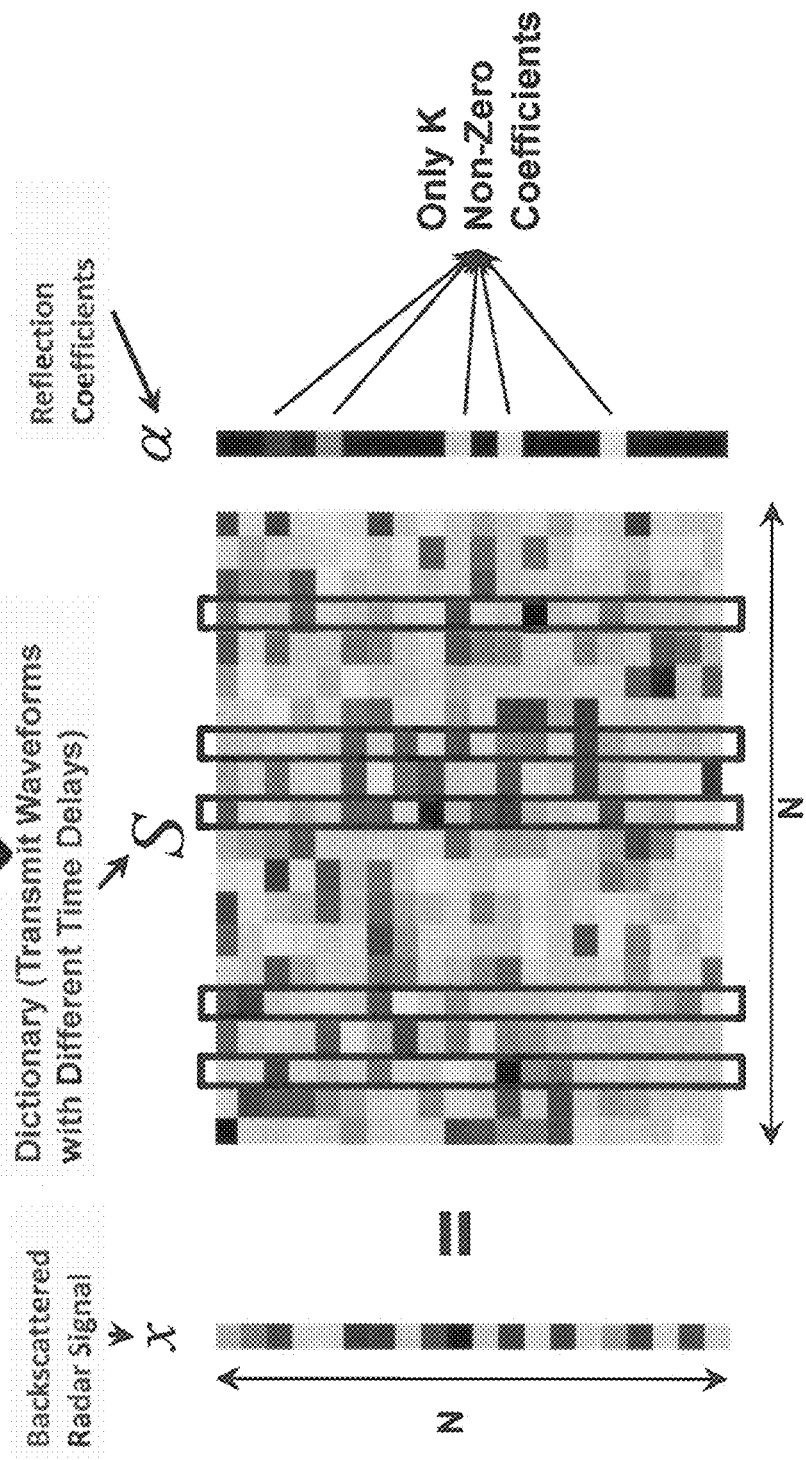

FIG. 10 is a schematic illustration of the signal model in matrix form.

Figure 11:
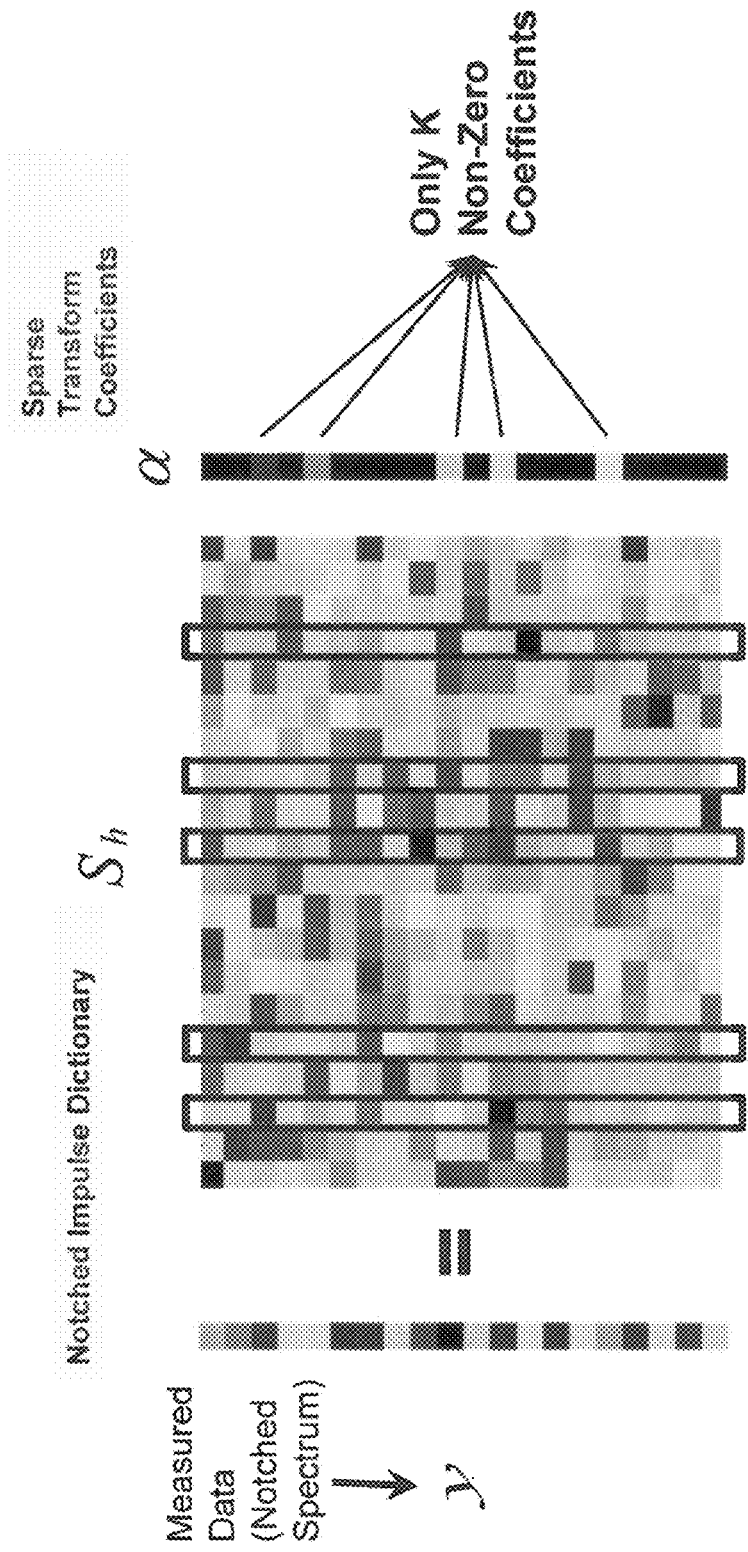

FIG. 11 is a schematic illustration of the signal model with missing frequency information in matrix form.

FIG. 12 is a schematic illustration of orthogonal matching pursuit algorithm.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A preferred embodiment of the present invention comprises a sparse-recovery model and reconstruction scheme. The invention allows the reconstruction of a wideband signal that has missing frequency bands.

Although the invention is demonstrated with the application of this technique to radar applications, the sampling and reconstruction technique of the present invention also works with other communication systems, especially ones that employ ultra high-frequency modulation schemes.

A preferred embodiment of the present invention comprises a sparsity-driven spectral recovery (SSR) technique that coherently estimates the spectral information in the frequency bands of the received data that may be either completely corrupted (due to the presence of interference sources) or nonexistent (because of no transmission in the prohibited frequency bands). The key innovative concept in the invention is that although the information is lost in the received signal due to the contaminated and missing frequency bands, the signal can be modeled as a linear combination of spectrally filtered and time-shifted versions of the transmitted waveform. Thus, by constructing a dictionary that consists of the spectrally filtered and time-shifted versions of the transmit waveform, the technique solves for a sparse solution of the coefficients that represent the significant components contributing to the received signal. The reconstruction using the preferred embodiment sparsity-driven spectral recovery SSR technique on spectrally corrupted and spectrally notched data is well matched with the original data, while conventional techniques only attempt to reduce the resulting artifacts rather than recover the original information.

An advantage of the preferred embodiment technique is that it not only suppresses noise and artifacts from noisy and frequency notched UWB data, it also recovers the original complex data (both amplitude and phase). Although the amplitude information is important for the first stage of signal (or target) detection, using this technique the target signature is preserved in the complex data that includes the phase content, which is the key for target discrimination and classification, and coherent change detection.

Another advantage of this technique is that because the contiguous (no abrupt changes) spectral content is recovered, this technique can achieve better performance with higher SNR in the suppression of the artifacts in the resulting data and imagery than other techniques that only attempt to reduce the noise and artifacts. In addition, since the resulting data comprises one single substantially contiguous frequency band instead of multiple non-contiguous subbands, subsequent processing (image formation, target detection and discrimination, etc.) steps are simple because they do not have to perform on multiple data sets. In addition, more information (wideband without gaps) would translate to better performance.

A third advantage of this technique is that it can also be employed to extrapolate the spectral information outside the included band. Thus, it effectively increases the bandwidth and improves the resolution of the signal. This will result in better performance in the detection and discrimination of targets.

Although a preferred embodiment of the invention discloses application of this technique for radar applications only, it is within the skill of the art to use the spectral recovery techniques of the present invention apply to such applications as communications systems, including UWB communication systems.

FIG. 1 illustrates overall schematic system block diagram of a preferred embodiment. In this case, a UWB radar system transmits using transmitter 101 and receives, using receiver 102, wideband signals. The wideband transmit pulse includes spectral notches that correspond to the prohibited frequency bands, such as, for example, those reserved for cell phone usage. The electromagnetic pulse propagates through the medium. Many backscattered pulses that correspond to the objects in the scene propagate through the medium and return to the receiver. The backscattered pulses are contaminated by interference sources (radio, TV, cellular phone, etc.). Thus, the receiver 102 receives the signal with a spectral content that includes 1) the notches from non-transmission frequency bands, and 2) the corrupted frequency bands due to interference sources. Since one does not have complete knowledge of these interference sources (no additional subsystem to measure the interference signals), the corrupted frequency bands are detected and zeroed out. These corrupted frequency bands are considered as additional notched bands that have to be recovered. The sparsity-driven spectral recovery (SSR) algorithm of the preferred embodiment processes the receive signal and recovers the information of the notched frequency bands. The waveform reconstruction processor 103 uses dictionaries 104 and 105 that include many time-shifted versions of the transmitted waveform. Note that the term "dictionary" refers to storage or memory for storage of data. As used herein, the terminology "dictionary" means an organized listing of data stored in machine-readable form for reference. The upper or first dictionary 104 includes the time shifted versions of the original transmit waveform. The lower or second dictionary 105 includes the spectrally filtered versions of the corresponding time waveform included in dictionary 104. The output is the receive signal with contiguous spectral content. For a communication system, the output signal would be processed by a detector. In this radar block diagram, the output signal is sent to the image processor 106 and target detection and discrimination circuitry 107. The resulting SAR image and the detection information are then visualized by the display 108.

In the embodiment shown, a dictionary is constructed from time-shifted versions of the transmit signal s(t). Without any spectral notches and interference sources, the received signal x(t) is simply the summation of reflections of all targets within the radar's range swath and beamwidth, i.e., the received signal is composed of a linear combination of delayed and weighted replicas of the transmitted pulse s(t) as follows:

$$x(t) = \sum_{i=1}^{M} \alpha_i s(t - \tau_i), \quad (1)$$

where the weighting coefficients $\alpha_i$ represent the target amplitudes and the time-shifting parameters $\tau_i$ model the phase changes that correspond to the travel distances. In other words, the received signal is simply the output of a linear time invariant (LTI) system modeled by the reflection coefficients and its sparsity is directly related to the complexity level of the scene. This signal model is schematically illustrated in FIG. 10.

If the received signal is assumed to be perfect (i.e., no spectral notches due to frequency allocation constraint and no interference sources), the collected digitized data record can be represented (in matrix form) as $$x = S\alpha \quad (2)$$

where N×1 column vector x is a length-N record, the N×N matrix S is the dictionary matrix whose columns contain the time-shifted versions of the transmitted signal s(t), and the N×1 column vector $\alpha$ is the sparse vector of weighting coefficients. Significant M coefficients in $\alpha$ indicate the existence of such objects. The positions and magnitude values of significant coefficients in $\alpha$ reveal the potential phase-shift (position) and amplitude information of significant targets. It is hypothesized that the record is sparse in the dictionary S, in the sense that there should only exist a finite number of significant coefficients in $\alpha$, which corresponds to the significant targets or objects within the observed scene. This signal model is schematically illustrated in FIG. 10. It is important to note that although the observed scene might be complex with many objects, the complexity M of the receive data record is significantly reduced since the reflections from all targets that have the same range distance from the radar transmitter/receiver would be represented by a single reflection coefficient and phase. The publication by Lam Nguyen and Trac Tran, "Robust Recovery of Synthetic Aperture Radar Data from Uniformly Under-Sampled Measurements," IEEE IGARSS, (Jun. 28, 2011) (hereby incorporated by reference), describes how the model can robustly represent real SAR data, and is hereby incorporated by reference.

The receive signal x specified by equation (2) is the perfect signal without any notches. Accordingly, y represents the spectrally notched signal. As mentioned above, the sources of the spectral notches are not only from the non-transmission bands, but also from the corrupted bands that correspond to the interference sources.

Let h be the transfer function (in vector form) that corresponds to the notched spectral. The actual receive signal is a convolution of the original signal and the transfer function:

$$y = x * h \quad (3)$$

Using Equations (2) and (3) $x_N$ can be rewritten as $$y = (S * h)\alpha = S_h \alpha \quad (4)$$

From equation (4), the dictionary $S_h = S*h$ is the notched dictionary version of the original dictionary S. Thus, the receive signal (with the notched spectral content) is a linear combination of the delayed and weighted replicas of the notched versions of the time-shifted transmit waveforms, which is schematically illustrated in FIG. 11. The coefficients $\alpha$ can be computed from the measurements y and the spectrally notched dictionary $S_h$ by solving the following optimization problem:

$$\alpha^* = \min |\alpha|_0 \text{ s.t. } y = S_h \alpha,$$

and the original signal can be recovered as $x^* = S\alpha^*$. The reconstructed $\alpha^*$ is roughly regarded as the sparsest solution from many possible solutions that satisfy the linear equation:

$$y = S_h \alpha^*.$$

The Compressed Sensing theory asserts that under several mild conditions of the matrix $S_N$, the above $l_0$-norm minimization problem ($L_0$-norm is simply its number of significant (non-zero) elements) can be efficiently solved by recasting it as the following $l_1$-norm convex optimization:

$$\alpha^* = \min |\alpha|_1 \text{ s.t. } x_N = S_N \alpha,$$

and the original signal can be recovered as $x^* = S_N \alpha^*$.

All of the recovered data records are then supplied to the time-domain back-projection image formation algorithm to produce the final SAR image.

There are various techniques for solving the inverse linear system of equations for the sparsest $\alpha^*$ in the compressed sensing community, which can be classified into two categories:

BASIS PURSUIT via linear programming (as described in E. Candés and T. Tao, "Decoding by linear programming," IEEE Trans. on Information Theory, vol. 51, no. 12, pp. 4203-4215 (December 2005) (hereby incorporated by reference) or gradient projection (as described in M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, no. 4, pp. 586-598 (April 2007) (hereby incorporated by reference);

MATCHING PURSUIT via orthogonal matching pursuit (as described in J. Tropp and A. Gilbert, "Signal recovery from random measurements via orthogonal matching pursuit," IEEE Trans. on Information Theory, vol. 53, no. 12, pp. 4655-4666 (December 2007) (hereby incorporated by reference)) regularized orthogonal matching pursuit (as described in D. Needell and R. Vershynin, "Signal recovery from incomplete and inaccurate Measurements via regularized orthogonal matching pursuit," IEEE Journal of Selected Topics in Signal Processing, vol. 4, pp. 310-316 (April 2010) (hereby incorporated by reference)), subspace pursuit (as described further in W. Dai and O. Milenkovic, "Subspace pursuit for compressive sensing: Closing the gap between performance and complexity," IEEE Trans. on Information Theory, vol. 55, pp. 2230-2249 (May 2009) (hereby incorporated by reference)), sparsity adaptive matching pursuit (as described further in T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (October 2008) (hereby incorporated by reference), etc.

In this implementation the orthogonal matching pursuit technique may be employed as described in J. Tropp and A. Gilbert, "Signal recovery from random measurements via orthogonal matching pursuit," IEEE Trans. on Information Theory, vol. 53, no. 12, pp. 4655-4666 (December 2007) (hereby incorporated by reference) to solve for $\alpha^*$ due to its simplicity, recovery robustness, and fast computation. This algorithm is graphically illustrated in FIG. 12.

Dictionary of Shifted Versions of Transmit Waveform as Sparsifying Matrix

In the vector space $C^N$ of N-dimensional signals, vector x can be represented as $x=\Psi\alpha$, where $\Psi$ is called the sparsifying matrix which in other words, the representation through $\Psi$ can be (and in many cases, should be). The sparsifying matrix is said to be complete if its columns span the entire N-dimensional space. The signal x is said to be strictly K-sparse when there are only K non-zero components in $\alpha$. When the sorted magnitudes of $(\alpha_i)$ decay very quickly and x can be well approximated with only K components, then x is said to be K-compressible. Needless to say, the effectiveness of the recovery algorithm of a class of signal x heavily depends on the sparsest representation of the signal class.

In standard compressed sensing, fixed linear transform bases such as the DCT, FFT and the discrete wavelet transform (DWT) or a combination of all three are often employed to obtain sparsity. In the UWB SAR system, the transmitted pulse is a monocycle impulse with an approximated bandwidth range of 300-3000 MHz. Current collected raw data captured in the 8 receivers do not exhibit any common sparse pattern. In other words, a quick spectrum analysis reveals that our raw data is not time-sparse or frequency sparse or even wavelet sparse. Hence, a naïve direct application of Compressed Sensing (CS) via random projection with Fourier, cosine, or wavelet bases yields disappointing results.

In a preferred embodiment approach, the dictionary is constructed from time shifted versions of the transmitted probing signal s(t). Define (i,j) with $1 \le i \le I$, $1 \le j \le J$ as the pixel location of a reflective target in the recovery area. The received signal x(t) is simply the summation of reflections of all targets within the recovery area, i.e., the received signal is composed of a linear combination of delayed and weighted replicas of the transmitted pulse s(t) as follows:

$$x(t) = \sum_{i,j} \alpha_{i,j} s(t - \tau_{i,j}), \ 1 \le i \le 1, \ 1 \le j \le J \quad \text{Equation (2D)}$$

where the weighting coefficients $\alpha_{i,j}$ represent signal attenuation and the time-shifting parameter $\tau_{i,j}$ model phase changes caused by different target properties and travel distances. In other words, the received signal x(t) is simply the output of an LTI system modeled by the reflection coefficients $\alpha_{i,j}$ and its sparsity is directly related to the complexity level of the scene. Suppose that there is a single perfect point source in the imaging area of interest and the resulting digitized samples at Nyquist rate of the received signal are stacked in a single column vector $s_0$. Define $s_i$ as the column vector containing all digitized samples at Nyquist rate of the received signal with the delay parameter $\tau_i$. Then, the collection of all of these column vectors will make up the time-delayed dictionary S that is employed in this preferred embodiment for signal sparsification where the increment in $\tau_i$ is set at the highest possible resolution that the hardware can support (at Nyquist sampling period). Then, further suppose that the received signal is sampled at the Nyquist rate, any collected digitized data record x can be represented as $$x = S\alpha = [s_0 s_1 s_2 \ldots s_N]\alpha \quad (3D)$$

where N×1 column vector x is a length-N record, the N×(I×J) matrix S is the matrix whose columns contain the time-shifted versions of the transmitted signal s(t), and the (I×J)×1 column vector $\alpha$ is the sparse vector of weighting coefficients. Significant coefficients in $\alpha$ indicate the existence of such objects. The positions and magnitude values of significant coefficients in $\alpha$ reveal the potential phase-shift (position) and amplitude information of significant targets. It is hypothesized that the record x is sparse in the dictionary S in the sense that there should only exist a finite number of significant coefficients in $\alpha$ which corresponds to the significant targets or objects within that local neighborhood.

Orthogonal Matching Pursuit

Numerous recovery techniques in the current Compressed Sensing (CS) literature can be employed to solve the optimization problem in Equation (6). In a preferred embodiment, Orthogonal Matching Pursuit (OMP) was chosen due to its simplicity, recovery robustness, and fast computation. OMP is also very simple to set up: the only required parameter is the sparsity level K. Once the sparsest coefficient vector $\alpha$ is found, the raw data record is recovered as in Equation (7). All of the recovered data records are then supplied to the back-projection image formation algorithm to produce the final SAR image.

From Wikipedia, the matching pursuit algorithm is described as Algorithm Matching Pursuit
Input: Signal: f(t); dictionary D.
Output: List of coefficients: $(\alpha_n; g_{\gamma n})$.
Initialization $$Rf_1 \leftarrow f(t);$$

$$n \leftarrow 1;$$

Repeat:
  find $g_{\gamma n} \in D$ with maximum inner product $|\langle Rf_n; g_{\gamma n}\rangle|$;
  $\alpha_n \leftarrow \langle f_n; g_{\gamma n}\rangle$;
  $Rf_{n+1} \leftarrow Rf_n - \alpha_n g_{\gamma n}$;
  $n \leftarrow n+1$;
  Until stop condition (for example: $\|Rf_n\| < \text{threshold}$)

An extension of Matching Pursuit (MP) is its orthogonal version: Orthogonal Matching Pursuit (OMP). The main difference with MP is that coefficients are the orthogonal projection of the signal f on the dictionary D. In fact, this algorithm solves the sparse problem:

$$\min_x \|f - Dx\|_2^2 \text{ such that } \|x\|_0 \le N,$$

with $\|x\|_0$ the $L_0$ pseudo-norm equal to the number of nonzero elements of x.

Results/Simulation Data

In this section, the validity and performance of the preferred embodiment approach is illustrated using results from simulated data. In this experiment, SAR radar was utilized;

configured in side-looking mode. It travels in the horizontal direction, transmits impulses to the imaging area, and receives backscattered radar signals from the targets. In this scene, there are many point targets that have different amplitudes and are located randomly throughout the scene. Using the backprojection SAR image formation, as described further in Nguyen, Lam and Tran, Trac "Robust Recovery of Synthetic Aperture Radar Data from Uniformly Under-Sampled Measurements," IEEE IGARSS, 2011, hereby incorporated by reference, SAR imagery is formed from radar data collected along the synthetic aperture. FIG. 3A shows the SAR image for this simulation scenario. This SAR image is served as the baseline image for performance comparison purpose.

Next the spectral notches are considered due to the frequency allocation restriction. FIG. 3B shows the corresponding SAR image formed using spectrally notched data. It is obvious that the resulting SAR image is very noisy. FIG. 3C shows the SAR image formed using recovered data from the invented technique.

FIGS. 4A, 4B, and 4D show the zoomed-in (only three targets from the scene) versions of the original, spectrally notched, and recovered SAR images, respectively. FIG. 4B shows that the spectrally notched data result in noise and artifacts in the resulting imagery. The noise and artifacts are well suppressed in the FIG. 4C. FIG. 4D compares the downrange profiles of the point target in three cases. The plot shows that the SSR technique performed almost perfectly in this case. The recovered downrange profile (red) aligned very well with the original data (blue). On the other hand, the spectrally notched range profile has reduced amplitude and increased sidelobes. In order to visualize and compare the algorithm's performance in reducing the sidelobes, the three downrange profiles are normalized and plotted in FIG. 5. This plot shows that the SRR technique reduced the sidelobe level by at least 15 dB.

FIG. 6 is the frequency domain plot that shows the spectral contents of a receive signal in three cases. The green notches show that there is no information is available in these frequency bands. In this case, the red curve (recovered data) shows that the recovered information is almost perfect compared to the original data (blue curve), even in the very wide spectral band (960-1215 MHz).

In a second simulation case, the target configuration is the same as case 1. However, in addition to the spectral notches due to the frequency authorization restriction, the receive data have corrupted frequency bands that correspond to several interference sources. FIG. 7A shows the SAR image using the original data. FIG. 7B shows the very noisy SAR image using the data that are spectrally notched and contaminated by the interference sources. FIG. 7C shows the SAR image using state-of-the-art interference suppression techniques (which zero out the frequency bins that belong to the contaminated bands) to clean the receive data. The noise level in the SAR image is reduced in this case. However, this background noise level is still relatively high. First, the technique does not do anything to recover the missing spectral bands. Second, incoherently zeroing out the contaminated frequency bins would result in higher sidelobes in the time (or spatial) domain. FIG. 7D shows the SAR image using the recovered data from the invented SSR technique. The quality of the SAR image in FIG. 7D is comparable to the original SAR image (FIG. 7A) without any spectral notches and interference noise.

Data Results from ARL UWB Radar

The preferred embodiment spectral recovery technique is also tested and evaluated using the data from the ARL UWB low-frequency SAR. The system is a time-domain impulse-based radar that transmits narrow pulses that occupy the frequency spectrum from 50 to 1150 MHz.

FIG. 8A shows a SAR image formed using data from the ARL UWB radar. This SAR image shows a target hidden behind foliage and tree area. The target has a weak linear response (front edge of the vehicle) followed by a larger amplitude response (dihedral formed by the body of the vehicle and the ground). This is one of the important features that can be used to uniquely identify a class of target. The SAR image also shows the point-like responses of several tree trunks in front of the target.

FIG. 8B shows the corresponding SAR image with spectral notches. The overall background noise of the SAR image is increased due to the spectral notches. The weak response of the target is embedded in the noise level and thus no longer detectable. The SAR image also shows the large ringing after the strong linear response from the target.

FIG. 8C shows the corresponding SAR image using the recovered data from the invented SSR technique. The quality of the SAR image is comparable to the original SAR image of FIG. 8A. The weak response of the target is now detectable due to the lower noise level.

Applications of the invention include radar applications: wide area mapping, surveillance, target detection and discrimination, concealed target detection, through-the-wall building mapping, tunnel detection, ground penetration radar, collision and obstacle, imaging radar, communication systems including high speed data links and network.

The sparsity-driven spectral recovery (SSR) technique coherently estimates the spectral information in the frequency bands of the received data that are completely corrupted (due to the presence of interference or jamming sources). The SSR technique coherently estimates the spectral information in the frequency bands of the received data that are nonexistent (because of no transmission in the prohibited frequency bands). The SSR technique can also be employed to extrapolate the spectral information outside the included band, thus it effectively increases the bandwidth and improves the resolution of the signal. This will result in better performance in the detection and discrimination of targets.

In summary, the preferred embodiments comprise a novel robust sparse-recovery technique that allows the reconstruction of wide-bandwidth radar data in real-time (single observation). Although much of the information is lost in the received signal due to frequency notching, a robust signal recovery is obtained via modeling the received radar waveform as a superposition of many backscattered signals from reflective point targets in the scene. The proposed technique is based on direct sparse recovery via OMP using a special dictionary containing many time-delayed versions of the transmitted probing signal. The technique allows the use of existing commercial-off-the-shelf (COTS) hardware and architecture. The algorithm was tested using real radar data from the U.S. Army Research Laboratory (ARL) Ultra-Wideband (UWB) synthetic aperture radar (SAR). The sparse-recovery model-based SMB technique successfully models and synthesizes the returned radar data from real scenes using a handful of coefficients and an analytical waveform that models the transmitted signal. SAR image quality from only 20% under-sampled data is essentially the same as the quality obtained from the original over-sampled data.

Possible uses of the invention include remote sensing applications such as target detection, anomaly detection, range detection, imaging radar, other remote sensors, communication systems, medical imaging systems, natural resource management, planning and monitoring. Using the concepts of the present invention, lost information from sub- Nyquist sampling may be recovered using sparsity modeling technique. The present invention allows the use of relatively inexpensive ADCs to capture wide bandwidth signals in real-time (not equivalent time). The preferred embodiment sampling technique affords data compression which facilitates reducing transmission bandwidth, particularly for sensors or networks of sensors. The preferred embodiment SMB technique can be used to extrapolate information. Once the SMB can successfully model data based upon a fraction of available information (sub-Nyquist data) it can further estimate and/or synthesize other information that might otherwise not exist in the input data.

The techniques provided by the embodiments herein may be implemented on an integrated circuit chip (not shown). The chip design is created in a graphical computer programming language; and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form in the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from hulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

As used herein "processor" may include but is not limited to a computer, central processing unit (CPU), microprocessor, multiprocessor, main frame computer, personal computer, or laptop computer.

As used herein, the terminology "sparsity driven" of "sparsity-driven" is a relative term relating to the finding of a compressible solution which is intended to be treated broadly. For example, a sparse matrix is a matrix with enough zeros that it pays to take advantage of them; commonly interpreted from an economics view point in that if one can save time and memory by exploiting the zeros, then a matrix is sparse. The terminology sparsity refers to the selection of a model, within a hierarchy of model classes, that yields a compact representation; i.e. a model that depends on only a few of the observations, selecting a small subset of features for classification or visualization. Selection of an optimal representation which is sufficiently sparse enables efficient computation by optimization techniques and alleviates the extreme difficulty encountered without sufficient sparsity.

As used herein, the terminology "target" area means area of interest, which may be, for example, a scene, an animal or human body or portion thereof, face (as in face recognition), object, ground region, field, landscape, aerial environment, or a combination thereof.

The term "noise" as used herein relates to observation noise. There are many sources that cause noise in the resulting observed signal. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets.

As used herein, the terminology "dictionary" means an organized listing of data stored in machine-readable form for reference. As an example, the "dictionary" may comprise time shifted versions of the transmitted probing signal $s(t)$.

As used herein the terminology "spectral" means of or relating to a spectrum. The terminology "spectrum" refers to a band, portion or region of the electromagnetic spectrum which may or may not be continuous, for example, the radio spectrum is the region of the electromagnetic spectrum spanning the radio frequency range. The terminology "spectra" is the plural of spectrum.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

APPENDIX A

Pseudo code of preferred methodology

```
%========== Get radar data (this block corresponds to step 1 of Figure 6)
Get radar data
%========== Form radar aperture (this block corresponds to step 2 of Figure 6)
Initialize variables for radar data
NumSamps number of samples per radar data record
NumAps number of aperture position
xR[NumAps] array of x-coordinates of radar receiving positions
    yR[NumAps] array of y-coordinates of radar receiving positions
    zR[NumAps] array of z-coordinates of radar receiving positions
    xT[NumAps] array of x-coordinates of radar transmitting positions
    yT[NumAps] array of y-coordinates of radar transmitting positions
    zT[NumAps] array of z-coordinates of radar transmitting positions
    s[NumSamps] the transmit waveform
    y[NumSamps| | NumAps] 2-D array of radar data
    x*[NamSamps| | NumAps] 2-D array of recovered radar data
    ts sampling period of radar data (in second)
    h impulse response of the spectral notch
%========== apply the invented technique to the radar data to form image
Initialize variables to define image grid (This correspond to step 4 of Figure 6).
    nRange Number of image pixels in range direction
    nXRange Number of image pixels in cross-range direction
    rIncr Image pixels spacing (meter) in range direction
    xrIncr Image pixels spacing (meter) in cross-range direction
    xref x-coordinate (in meter) of image center
    yref y-coordinate (in meter) of image center zref z-coordinate (in meter) of image
center
%====== Generate a dictionary of time-shifted transmit waveforms.
S = Generate_Dictionary (s)
%====== Generate a notch dictionary of spectrally filtered time-shifted transmit waveforms
S_h = Generate_Notch_Dictionary (s, h)
%====== Recovery of receive radar signal with missing frequency information
For i =1 to NumAps
    Find the sparsest representation α* of the corrupted receive radar signal y_i at the
    i-th aperture position w.r.t. the dictionary S_h
        α* = argmin |α|_1 s.t. y_i = S_h a
    Compute the recovered radar signal at the i-th aperture position
            x_i* = Sα*
End For Loop
%====== SAR image reconstruction from recovered radar data & back projection algorithm
im = Backprojection (recovered radar data x*, image grid)
```

What is claimed is:

1. A system of recovering missing spectral information in a wide band signal comprising:

at least one receiver for receiving data signal responses from a target area; the received data signal responses being spectrally notched with respect to at least one predetermined spectrum;

at least one processor for recovery of data from the data signal responses operatively connected to the at least one receiver that digitizes the received data signals; the at least one processor operating to generate a wideband signal that corresponds to a signal that is not spectrally notched;

a first dictionary comprising time-shifted unnotched versions of a transmit signal based upon spectra containing the at least one predetermined spectrum, a second dictionary comprising a plurality of spectrally notched time-shifted versions of the transmit signal corresponding to the transmit signal contained in the first dictionary;

whereby the first and second dictionaries operate to provide data to the at least one processor to compensate for the spectrally notched responses in order to provide a signal that corresponds to a signal that is not spectrally notched.

2. The system of claim 1 wherein the wideband signal is transmitted using a transmit pulse that includes at least one spectral notch that removes a prohibited frequency band or bands, and the at least one receiver's data signal responses are spectrally notched at the prohibited frequency band or bands, and wherein the first and second dictionaries operate to provide supplemental information that compensates for information missing due to the notching of the prohibited frequency band or bands.

3. The system of claim 2 wherein the first dictionary comprises collected data records x which can be represented as x=Sα where x represents a column vector containing a data record and matrix S is a matrix whose columns contain time shifted versions of the transmit signal and α is the sparse vector of weighting coefficients wherein significant coefficients reveal potential phase-shift and amplitude information of significant targets and $\alpha$ is optimized to be the sparsest vector using the equation $y=S_h\alpha$, where the second dictionary is represented by $S_h$ and y represents the spectrally notched signal.

4. The system of claim 1 wherein a signal representative of the unnotched spectra is formed from the spectrally notched time-shifted versions of the transmit signal, time-shifted unnotched versions of the transmit signal and spectrally notched receive data using one of orthogonal matching pursuit, basis pursuit, gradient projection, matching pursuit, orthogonal matching pursuit, regularized matching pursuit or subspace pursuit.

5. The system of claim 1 wherein the time-shifted unnotched versions of the transmit signal in the first dictionary comprises a matrix of digitized samples of unnotched versions of the transmit signal stacked in column vectors, each column vector associated with an incremental delay, and wherein the incremental delay is substantially the highest increment possible that the system can support without an ineffective signal being produced.

6. The system of claim 1 wherein the second dictionary may be represented by $S_h$ in the equation $y=S_h\alpha$, where y represents the spectrally notched signal, and $\alpha$ represents a sparse vector of weighting coefficients and a linear combination for signal recovery is solved using an orthogonal matching pursuit technique wherein $\alpha$ is optimized to be the sparsest vector.

7. The system of claim 1 wherein a linear combination used for reconstruction of the signal comprises the use of time-shifted and weighted replicas of the transmit signal, where the weighting correlates to signal attenuation and the time shifting utilizes at least one parameter to model phase changes caused by different target properties and travel distances.

8. The system of claim 1 wherein the at least one processor comprises a waveform reconstruction processor and wherein a real response from the target area is measured and employed in the construction of the first and second dictionaries.

9. A system of recovering missing spectral information in a wide band signal comprising:
at least one receiver for receiving data signal responses from a target area; the received data signal responses being spectrally filtered with respect to at least one predetermined spectrum, the spectral filtering occurring due to one or more of interference at at least one frequency or prohibitions against operation at prohibited frequency bands;
at least one processor for recovery of data from the data signal responses operatively connected to the at least one receiver that digitizes the received data signals; the output of the at least one processor correlating to a response without filtering of the at least one predetermined spectrum;
a first dictionary comprising time-shifted responses based upon the wideband signal waveform without filtering of the at least one predetermined spectrum;
a second dictionary comprising spectrally filtered responses of the corresponding time waveform contained in the first dictionary;
whereby the first and second dictionaries operate to provide data to the at least one processor to compensate for the spectrally filtered responses in order to provide a composite image representative of unfiltered spectra.

10. A system of recovering information wide band signal comprising:
at least one receiver for receiving data signal responses from a target area; the received data signal responses having information missing at a plurality of frequencies;
at least one processor for recovery of data from the data signal responses operatively connected to the at least one receiver; the at least one processor operating to generate a wideband signal that corresponds to a signal that does not have information missing at a plurality of frequencies;
a first memory comprising time-shifted unnotched versions of a transmit signal including the plurality of missing frequencies;
a second memory comprising a plurality of spectrally notched time-shifted versions of the transmit signal corresponding to the transmit signal contained in the first memory;
whereby the first and second memories operate to provide data to the at least one processor to compensate for the information missing at the plurality of frequencies.

11. The system of claim 10 wherein the information missing at a plurality of frequencies is due to spectral filtering, the spectral filtering occurring due to one or more of interference at at least one frequency or prohibitions against operation at prohibited frequency bands.

12. The system of claim 11 wherein the wideband signal is transmitted using a transmit pulse that includes at least one spectral notch that removes a prohibited frequency band or bands, and the at least one receiver's data signal responses are spectrally notched at the prohibited frequency band or bands, and wherein the first and second dictionaries operate to provide supplemental information that compensates for the information missing due to the notching of the prohibited or missing frequencies.

13. The system of claim 10 wherein the first and second memories comprise first and second dictionaries respectively, and wherein the received data signal responses are spectrally notched with respect to the plurality of frequencies; the at least one processor operating to recover data missing at the plurality of frequencies using the first and second dictionaries; the first dictionary comprising time-shifted unnotched versions of the transmit signal, the second dictionary comprising a plurality of spectrally filtered time-shifted notched versions of the transmit signal; whereby the first and second dictionaries operate to provide data to the at least one processor to provide a composite image representative of the unfiltered spectra.

14. The system of claim 10 wherein the time shifted unnotched versions of the transmit signal of the first memory are based upon the wideband signal waveform; and wherein the second memory comprises spectrally notched versions of the corresponding time wideband signal waveforms contained in the first memory, and the output of the at least one processor correlates to a response containing data from the missing frequencies.

15. The system of claim 14 wherein the output of the at least one processor is formed using one of orthogonal matching pursuit, basis pursuit, gradient projection, matching pursuit, orthogonal matching pursuit, regularized matching pursuit or subspace pursuit.

16. The system of claim 14 wherein the time shifted unnotched versions of the transmit signal comprise a matrix of digitized samples stacked in column vectors, each column vector associated with an incremental delay, and wherein the incremental delay is substantially the highest increment possible that the system can support without an ineffective signal being produced.

17. The system of claim 10 wherein the missing frequencies is a notched spectral, and the first memory comprises a first matrix that may be represented by matrix S, and the second memory comprises a second matrix based upon the notched spectral that may be represented by the matrix $S_h$ where the relationship between the two matrices is $S_h=S*h$, wherein the matrix $S_h$ represents the notched versions of the time-shifted transmit waveforms, and where h is the transfer function in vector form that corresponds to the notched spectral and the actual received signal y is a convolution of the original signal x and the transfer function h represented by the equation $y=x*h$ and wherein the coefficients α can be computed from the measurements y and the spectrally notched dictionary $S_h$ by solving the following optimization problem:

$$\alpha^* = \min|\alpha|_0 \text{ such that } y = S_h\alpha.$$

18. A method of recovery of missing frequency bands when using notched wide band signal transmission system comprising:
receiving data signal responses from a target area using at least one receiver; the received data signal responses being spectrally notched with respect to at least one predetermined spectrum;
digitizing the received data signals using at least one processor for recovery of data from the data signal responses operatively connected to the at least one receiver;
creating a first dictionary comprising unnotched time-shifted versions of a transmit signal based upon spectra containing the at least one predetermined spectrum,
creating a second dictionary comprising a plurality of spectrally notched time-shifted versions of the transmit signal corresponding to the transmit signal contained in the first dictionary; the first and second dictionaries operating to provide data to the at least one processor to compensate for the spectrally notched responses in order to provide a wideband signal that corresponds to a signal that is not spectrally notched;
using the at least one processor, generating a wideband signal that corresponds to a signal that is not spectrally notched.

19. The method of claim 18 wherein the unnotched time shifted versions of the transmit signal in the first dictionary are based upon the wideband signal waveform; and wherein the second dictionary comprises spectrally notched versions of the corresponding time waveforms contained in the first dictionary, and the output of the at least one processor correlates to a response containing data from the missing frequencies.

20. The method of claim 18 wherein the first memory comprises a first matrix that may be represented by matrix S, and the second memory comprises a second matrix based upon the notched spectral that may be represented by the matrix $S_h$ where the relationship between the two matrices is $S_h=S*h$, wherein the matrix $S_h$ is notched versions of time-shifted transmit waveforms, and where h is the transfer function in vector form that corresponds to the notched spectral and the actual received signal y is a convolution of the original signal x and the transfer function h represented by the equation $y=x*h$ and wherein the coefficients α can be computed from the measurements y and the spectrally notched dictionary $S_h$ by solving the following optimization problem:

$$\alpha^* = \min|\alpha|_0 \text{ such that } y = S_h\alpha.$$

* * * * *